(12) United States Patent
Gran et al.

(10) Patent No.: US 8,544,046 B2
(45) Date of Patent: Sep. 24, 2013

(54) SYSTEM AND METHOD FOR CONTROLLING MEDIA RENDERING IN A NETWORK USING A MOBILE DEVICE

(75) Inventors: Christian Gran, Falkemsee (DE); Andreas Zisowsky, Berlin (DE); Ralph Neff, San Diego, CA (US); Magdalena Leuca Espelien, San Diego, CA (US)

(73) Assignee: Packetvideo Corporation, San Diego, CA (US)

( * ) Notice: Subject to any disclaimer, the term of this patent is extended or adjusted under 35 U.S.C. 154(b) by 927 days.

(21) Appl. No.: 12/287,442

(22) Filed: Oct. 9, 2008

(65) Prior Publication Data
US 2010/0095332 A1    Apr. 15, 2010

(51) Int. Cl.
H04N 7/18      (2006.01)
H04N 7/173     (2011.01)
G06F 15/167    (2006.01)
G06F 15/16     (2006.01)

(52) U.S. Cl.
USPC ............... 725/80; 725/82; 725/91; 725/92; 725/93; 709/216; 709/231

(58) Field of Classification Search
None
See application file for complete search history.

(56) References Cited

U.S. PATENT DOCUMENTS

| | | |
|---|---|---|
| 5,790,848 A | 8/1998 | Wlaschin |
| 5,862,325 A | 1/1999 | Reed et al. |
| 6,141,682 A | 10/2000 | Barker |
| 6,167,092 A | 12/2000 | Lengwehasatit |
| 6,182,287 B1 | 1/2001 | Schneidewend et al. |
| 6,304,969 B1 | 10/2001 | Wasserman et al. |
| 6,407,680 B1 | 6/2002 | Lai et al. |
| 6,498,865 B1 | 12/2002 | Brailean et al. |
| 6,529,552 B1 | 3/2003 | Tsai et al. |
| 6,804,717 B1 | 10/2004 | Bakshi et al. |
| 6,865,600 B1 | 3/2005 | Brydon et al. |
| 6,941,324 B2 | 9/2005 | Plastina et al. |
| 7,006,631 B1 | 2/2006 | Luttrell |
| 7,139,279 B2 | 11/2006 | Jabri et al. |
| 8,316,082 B2 | 11/2012 | Igarashi |
| 2002/0002044 A1 | 1/2002 | Naruse et al. |
| 2003/0048855 A1 | 3/2003 | Klaghofer et al. |
| 2003/0067872 A1 | 4/2003 | Harrell et al. |
| 2003/0093267 A1 | 5/2003 | Leichtling et al. |
| 2003/0140343 A1 | 7/2003 | Falvo et al. |

(Continued)

FOREIGN PATENT DOCUMENTS

WO    WO 2007105568 A1 *  9/2007

OTHER PUBLICATIONS

PCT/US2005/015247, filed Nov. 17, 2005, Stark et al.

*Primary Examiner* — Chris Parry
*Assistant Examiner* — Omar S Parra
(74) *Attorney, Agent, or Firm* — Patents+TMS, P.C.

(57) ABSTRACT

A system and a method control media rendering in a network using a mobile device. The system and the method manage, control and/or render media in a home network using remote access and/or a remote user interface. The system and the method enable a user to control media rendering from multiple storage devices and/or multiple servers connected to the home network using the mobile device. The system and the method enable a user to control media rendering on multiple rendering devices connected to the home network using the mobile device. The system and the method have a control element hosted on a fixed, non-mobile device connected directly to the home network or connected to the home network as a stand-alone device.

35 Claims, 20 Drawing Sheets

(56) References Cited

U.S. PATENT DOCUMENTS

| | | |
|---|---|---|
| 2003/0142744 A1 | 7/2003 | Wu et al. |
| 2003/0229900 A1 | 12/2003 | Reisman |
| 2004/0068536 A1 | 4/2004 | Demers et al. |
| 2004/0070678 A1 | 4/2004 | Toyama et al. |
| 2004/0077313 A1 | 4/2004 | Oba et al. |
| 2004/0088369 A1 | 5/2004 | Yeager et al. |
| 2004/0116067 A1 | 6/2004 | Karaoguz et al. |
| 2004/0158645 A1 | 8/2004 | Morinaga et al. |
| 2004/0174817 A1 | 9/2004 | Jabri et al. |
| 2004/0193762 A1 | 9/2004 | Leon et al. |
| 2004/0218673 A1 | 11/2004 | Wang et al. |
| 2005/0008030 A1 | 1/2005 | Hoffman et al. |
| 2005/0028208 A1 | 2/2005 | Ellis et al. |
| 2005/0095981 A1 | 5/2005 | Benco |
| 2005/0097595 A1 | 5/2005 | Lipsanen et al. |
| 2005/0251576 A1* | 11/2005 | Weel .............................. 709/227 |
| 2006/0008256 A1 | 1/2006 | Khedouri et al. |
| 2006/0010472 A1 | 1/2006 | Godeny |
| 2006/0013148 A1 | 1/2006 | Burman et al. |
| 2006/0029041 A1 | 2/2006 | Jabri et al. |
| 2006/0031883 A1 | 2/2006 | Ellis et al. |
| 2006/0056336 A1 | 3/2006 | Dacosta |
| 2006/0056416 A1 | 3/2006 | Yang et al. |
| 2006/0159037 A1 | 7/2006 | Jabri et al. |
| 2006/0161635 A1 | 7/2006 | Lamkin et al. |
| 2006/0176877 A1 | 8/2006 | Jabri et al. |
| 2007/0011277 A1 | 1/2007 | Neff et al. |
| 2007/0027808 A1 | 2/2007 | Dooley, IV et al. |
| 2007/0076711 A1 | 4/2007 | Shuster |
| 2007/0076756 A1 | 4/2007 | Chan et al. |
| 2007/0093275 A1 | 4/2007 | Bloebaum et al. |
| 2007/0112935 A1 | 5/2007 | Espelien |
| 2007/0116036 A1 | 5/2007 | Moore |
| 2007/0143806 A1 | 6/2007 | Pan |
| 2007/0156770 A1 | 7/2007 | Espelien |
| 2007/0186003 A1 | 8/2007 | Foster et al. |
| 2007/0189275 A1 | 8/2007 | Neff |
| 2007/0220555 A1 | 9/2007 | Espelien |
| 2007/0226315 A1 | 9/2007 | Espelien |
| 2007/0233701 A1 | 10/2007 | Sherwood et al. |
| 2007/0245399 A1 | 10/2007 | Espelien |
| 2007/0255809 A1* | 11/2007 | Chiba .......................... 709/219 |
| 2007/0266047 A1 | 11/2007 | Cortes et al. |
| 2007/0276864 A1 | 11/2007 | Espelien |
| 2007/0288478 A1 | 12/2007 | DiMaria et al. |
| 2008/0021952 A1 | 1/2008 | Molinie et al. |
| 2008/0037489 A1 | 2/2008 | Yitiz et al. |
| 2008/0039967 A1 | 2/2008 | Sherwood et al. |
| 2008/0052348 A1* | 2/2008 | Adler et al. ................. 709/203 |
| 2008/0090590 A1 | 4/2008 | Espelien |
| 2008/0154696 A1 | 6/2008 | Spiegelman et al. |
| 2008/0235733 A1* | 9/2008 | Heie et al. ...................... 725/46 |
| 2009/0133070 A1* | 5/2009 | Hamano et al. ................. 725/46 |
| 2009/0193469 A1* | 7/2009 | Igarashi ........................ 725/56 |
| 2009/0228919 A1* | 9/2009 | Zott et al. ...................... 725/34 |
| 2009/0248702 A1* | 10/2009 | Schwartz et al. ............... 707/10 |
| 2009/0249222 A1* | 10/2009 | Schmidt et al. ............... 715/751 |
| 2010/0058398 A1* | 3/2010 | Ojala et al. ..................... 725/62 |
| 2010/0332994 A1* | 12/2010 | Istvan et al. ................... 715/740 |
| 2011/0044338 A1* | 2/2011 | Stahl et al. .................... 370/392 |
| 2011/0179139 A1* | 7/2011 | Starkenburg et al. ......... 709/217 |
| 2011/0225417 A1* | 9/2011 | Maharajh et al. ............. 713/150 |
| 2012/0066336 A1* | 3/2012 | Grannan ....................... 709/213 |

* cited by examiner

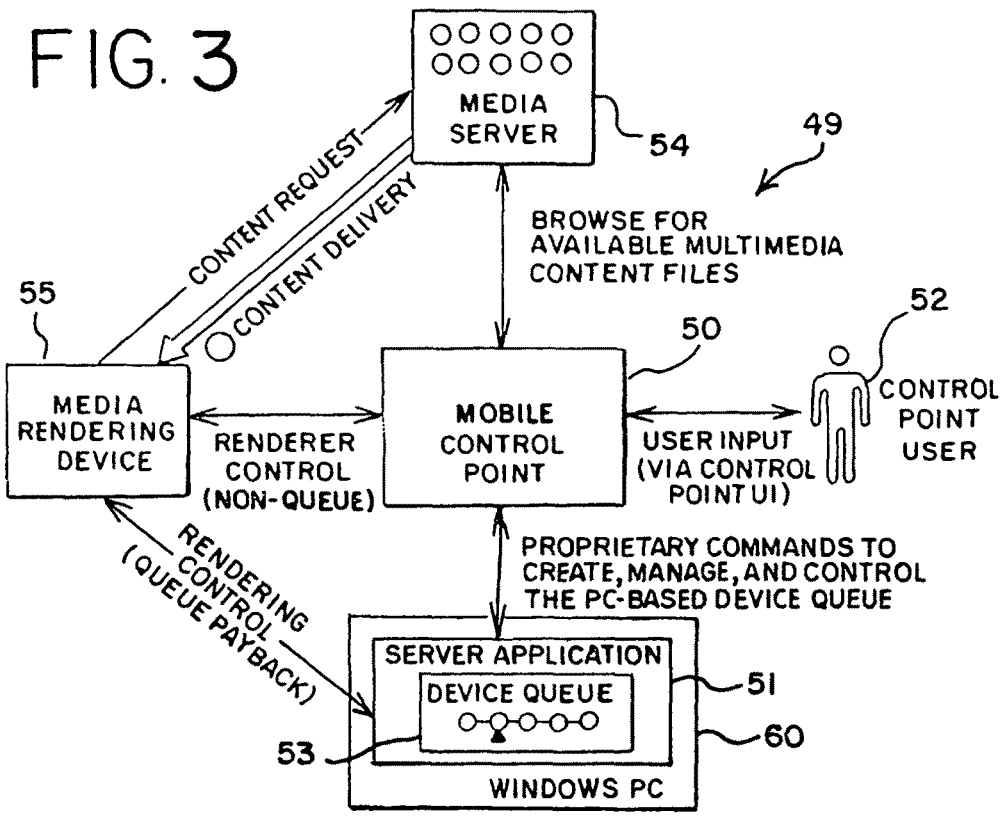
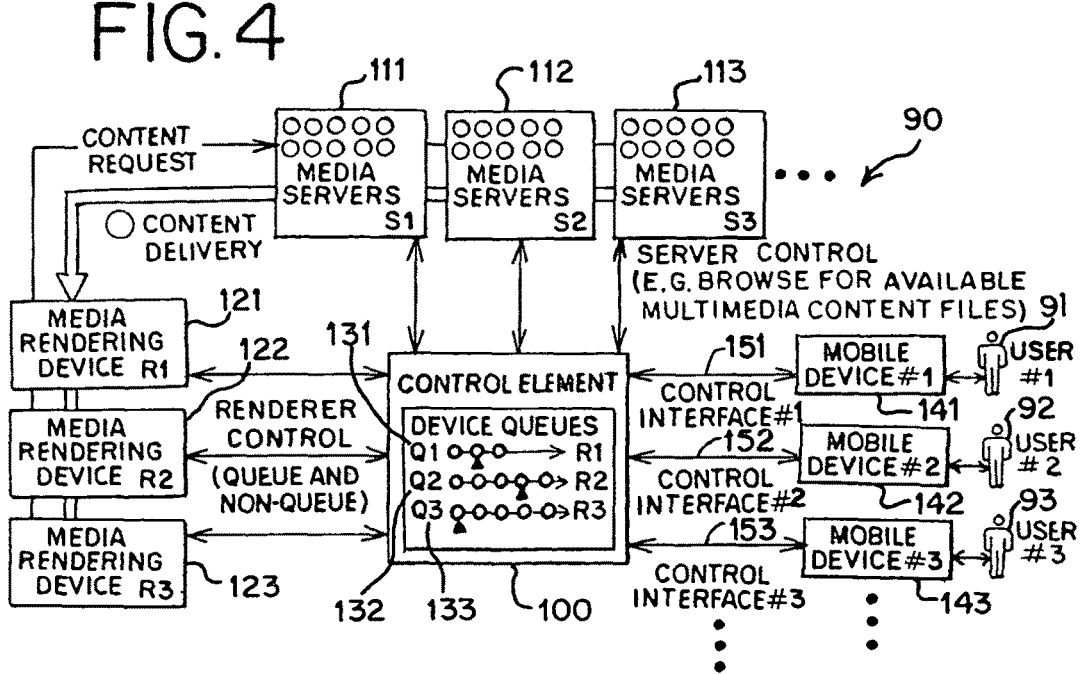

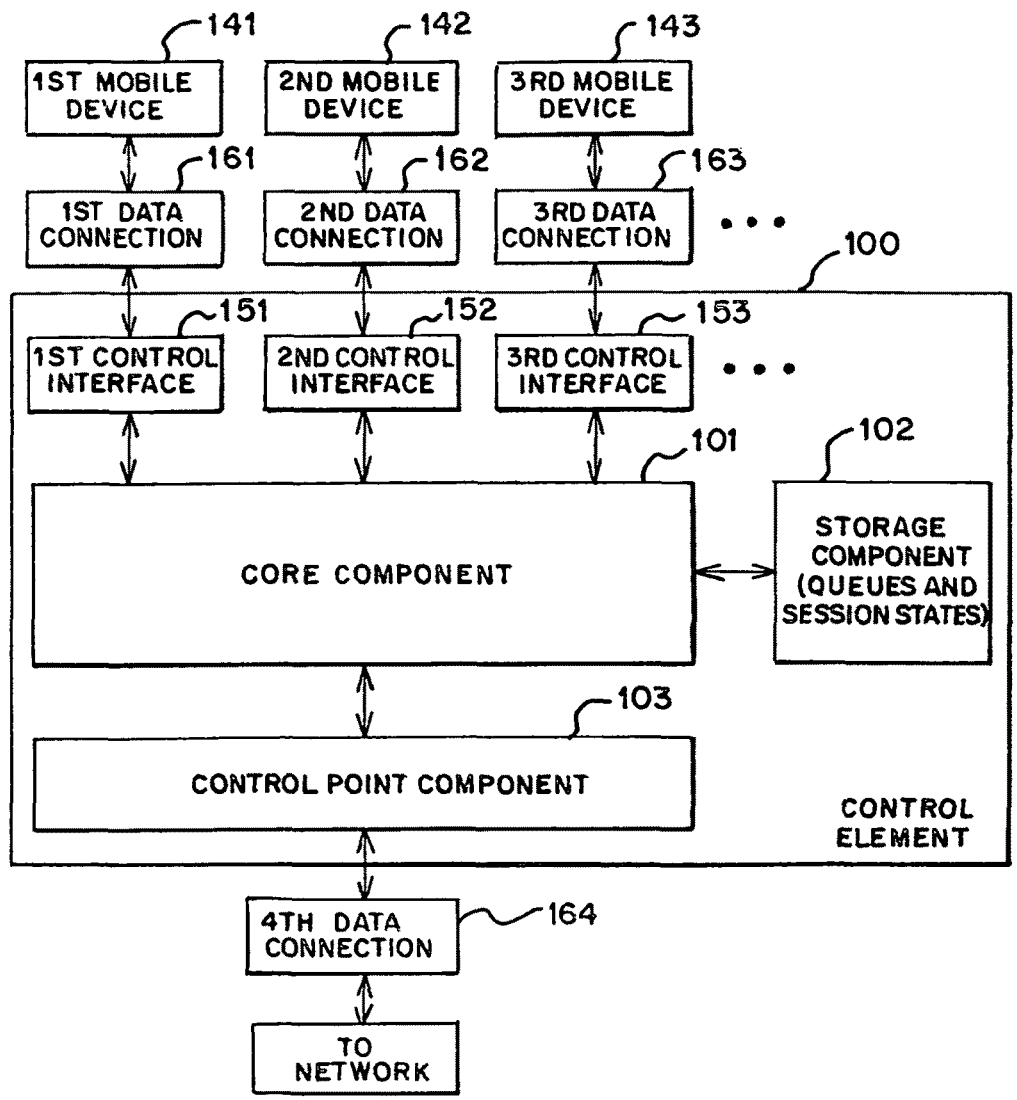

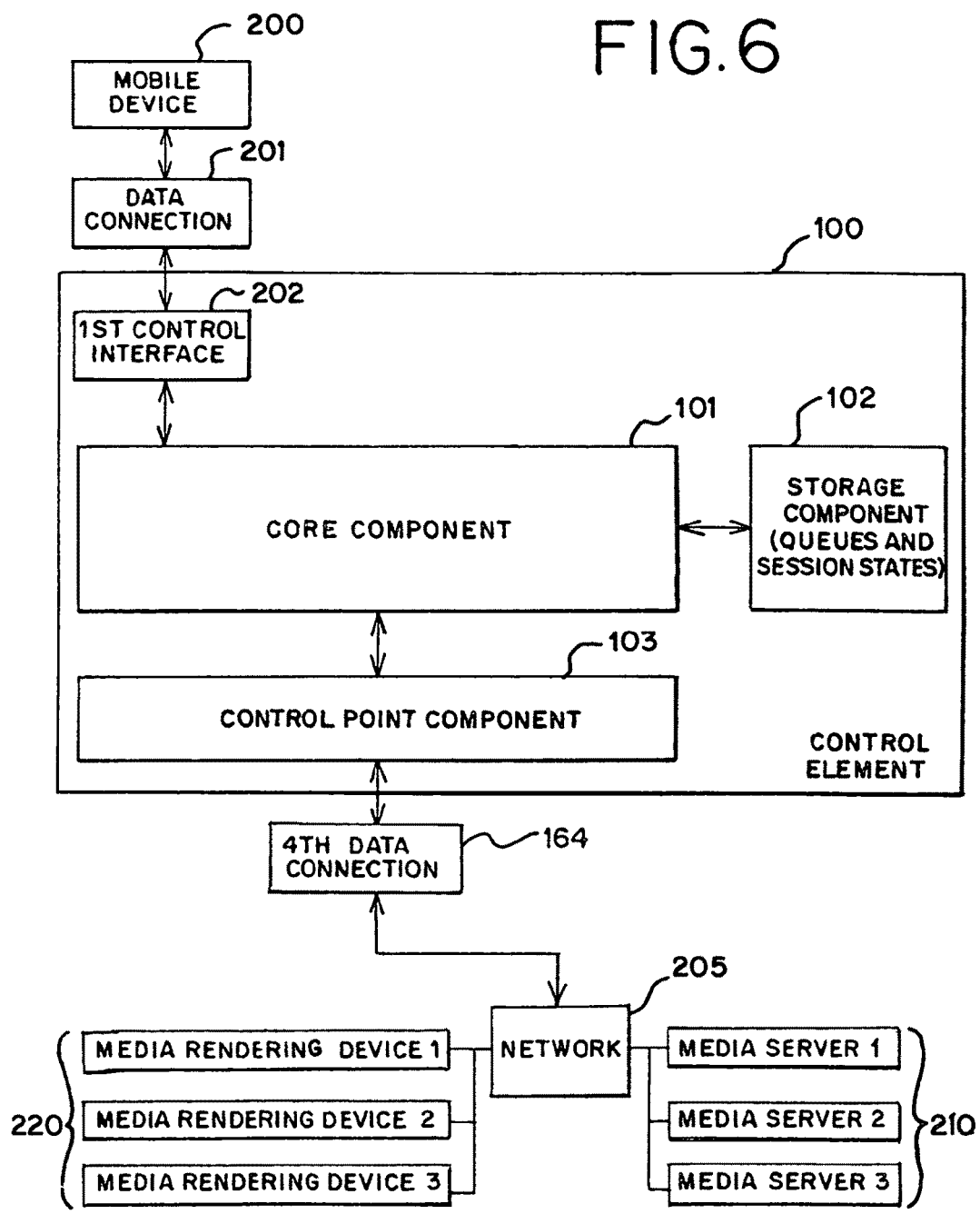

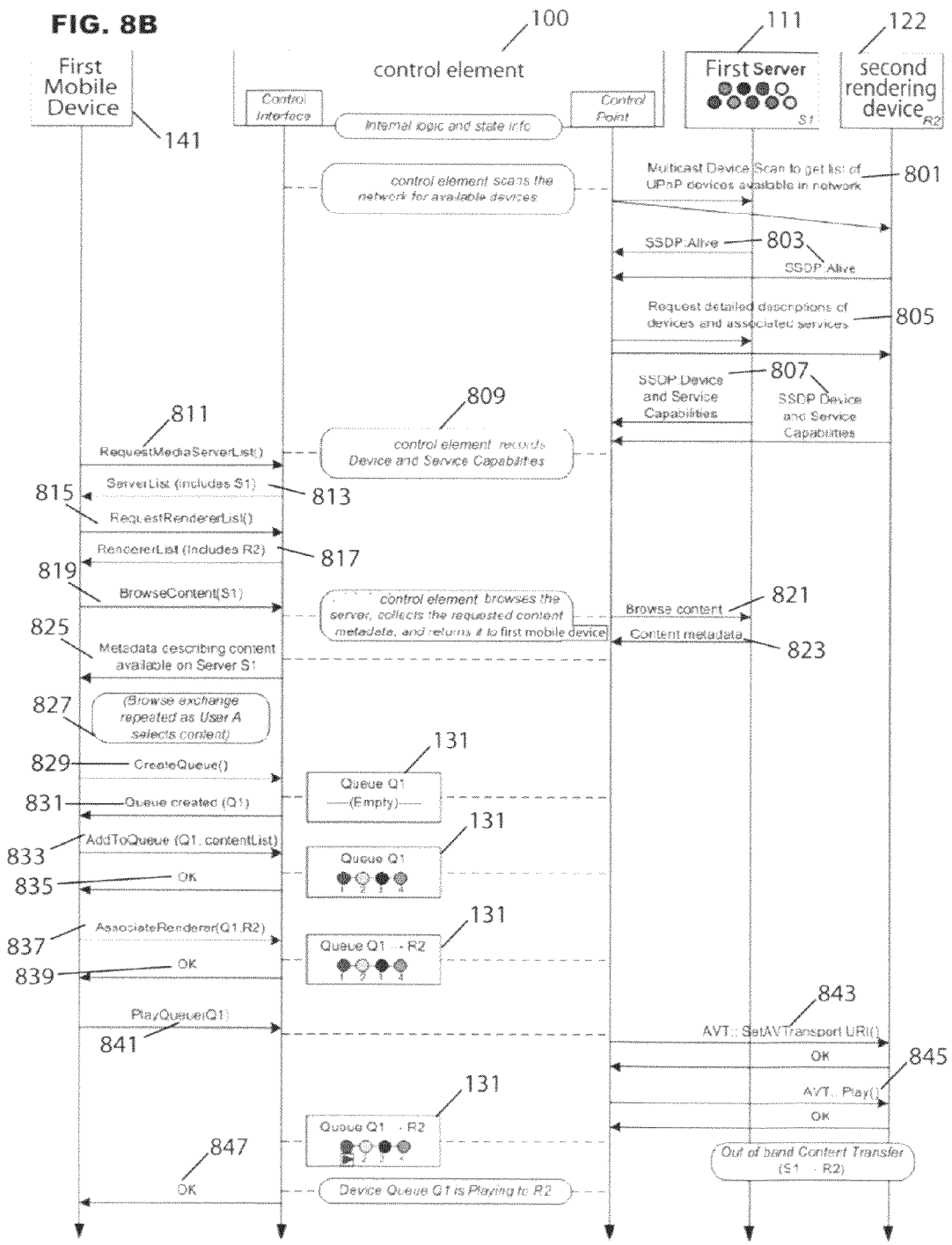

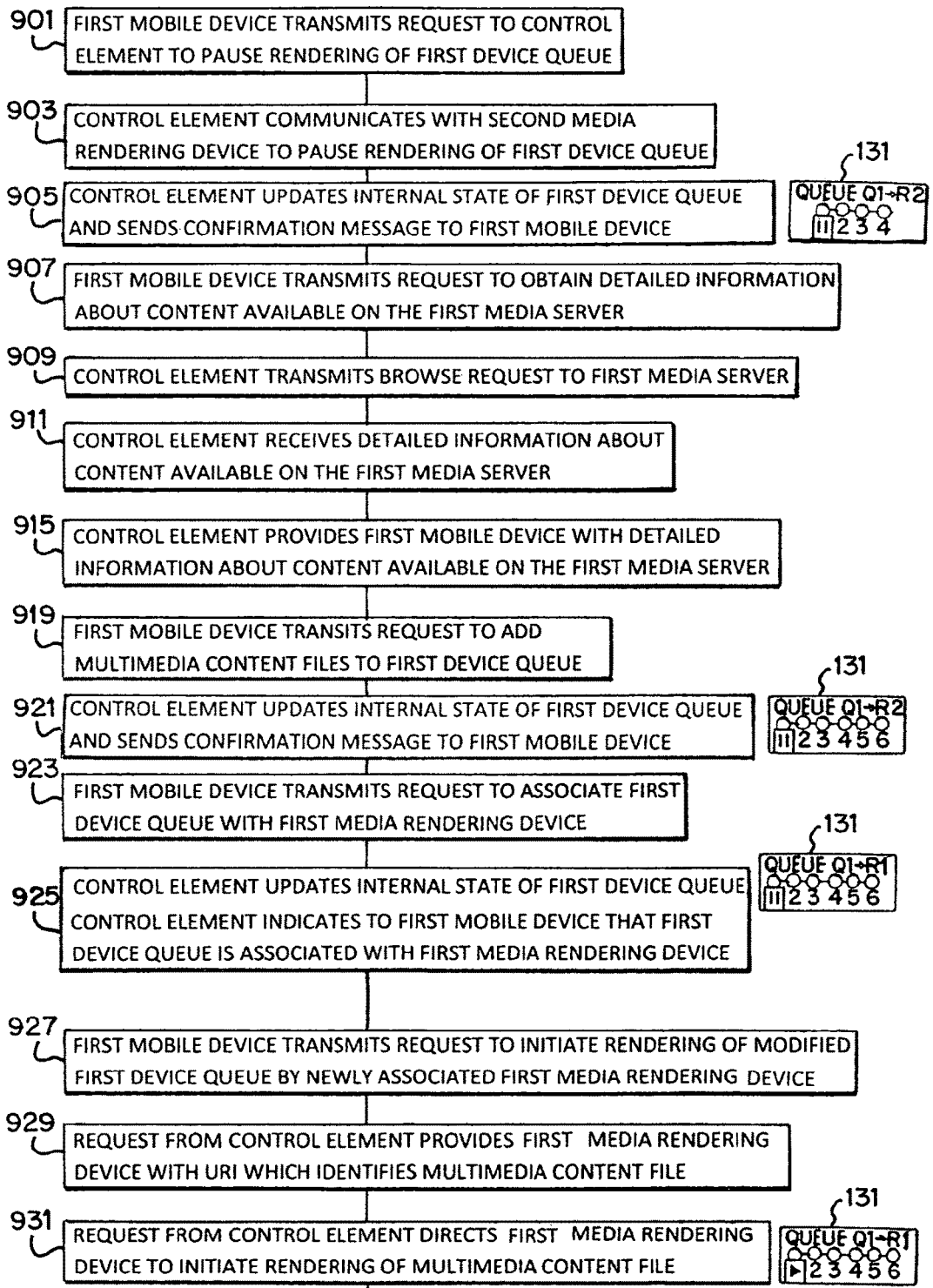

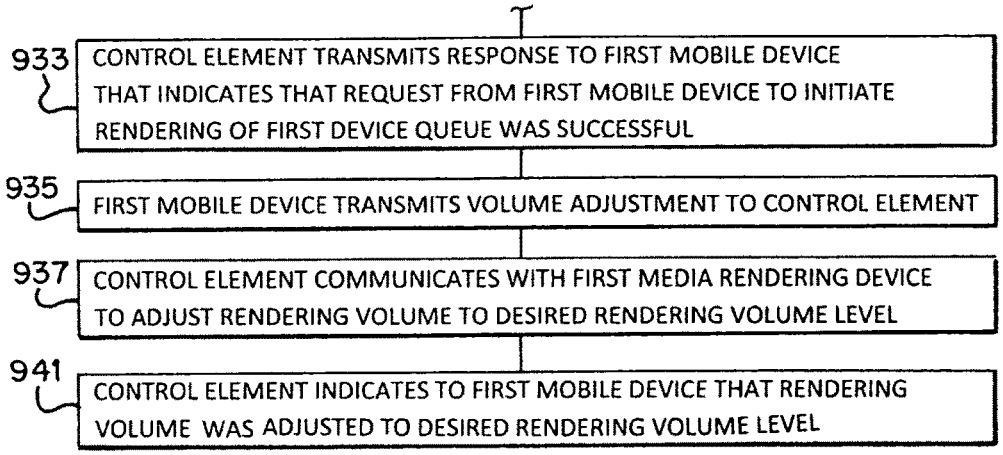

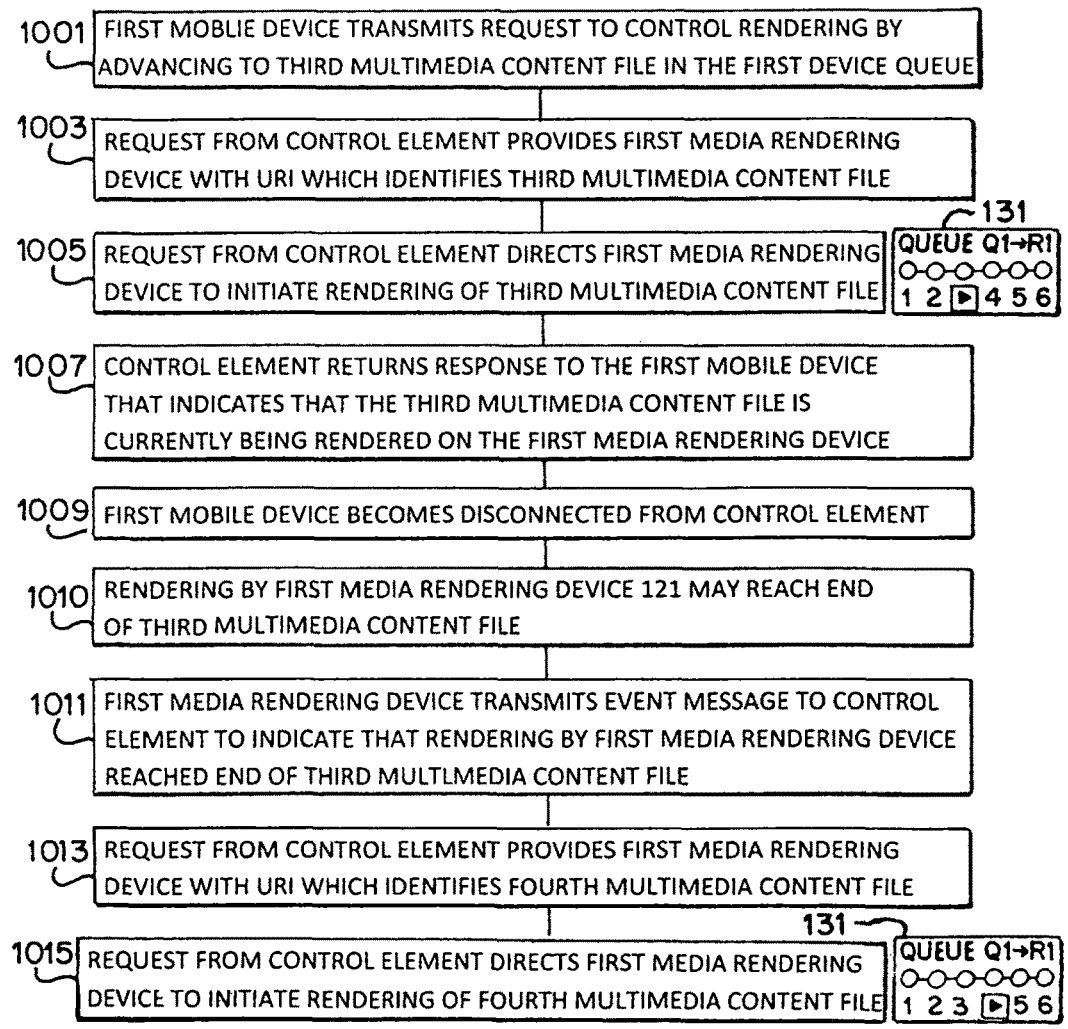

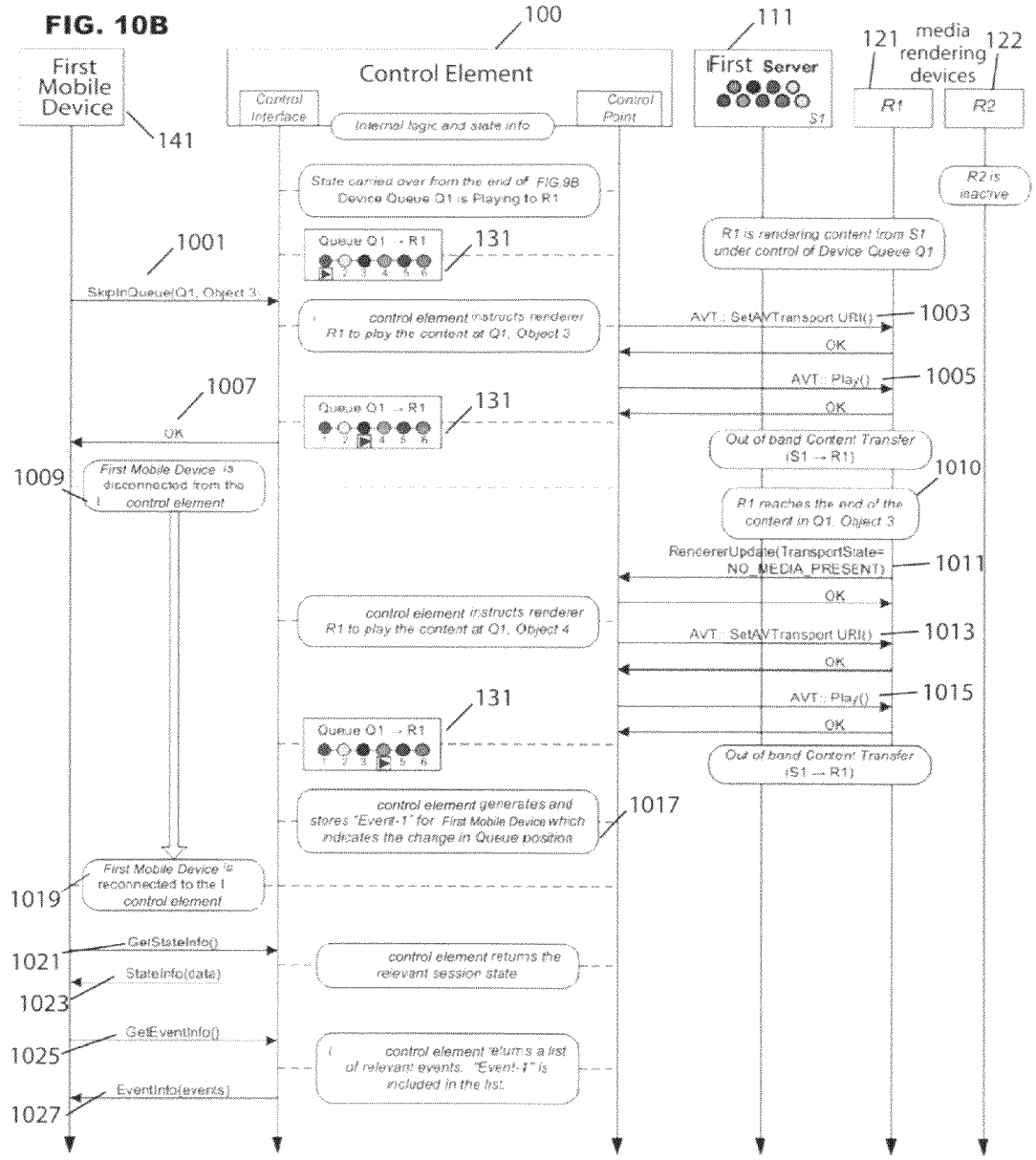

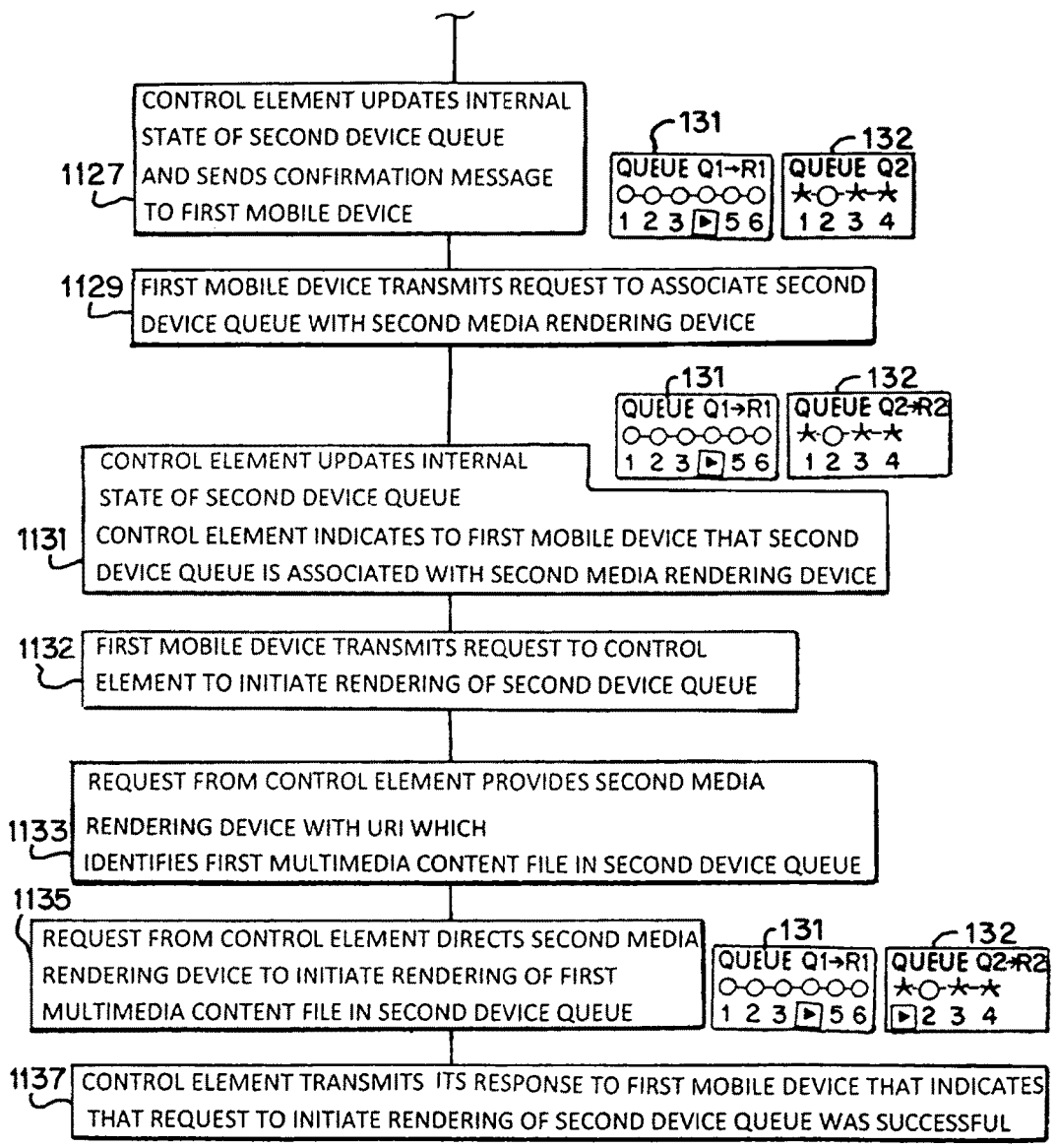

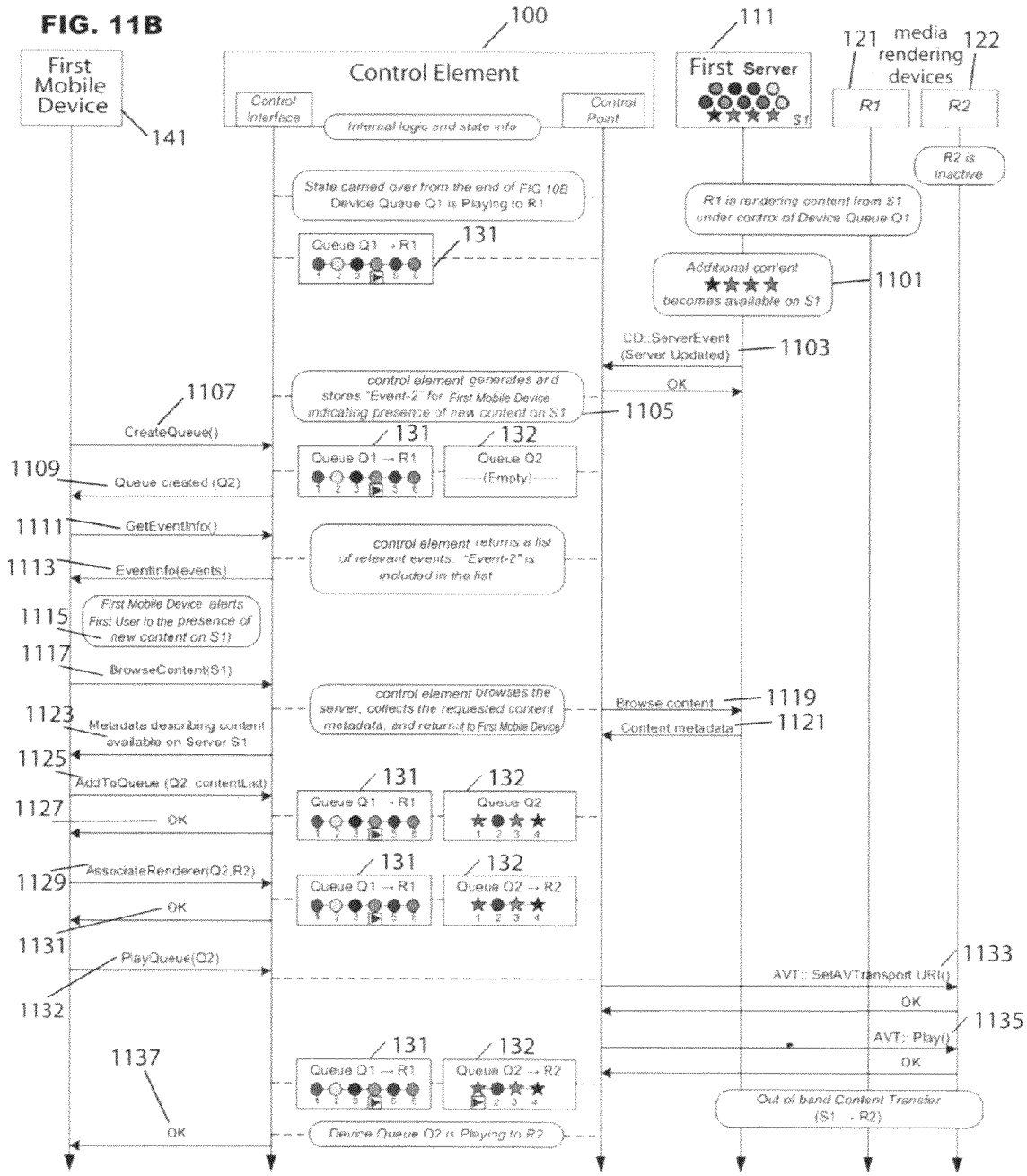

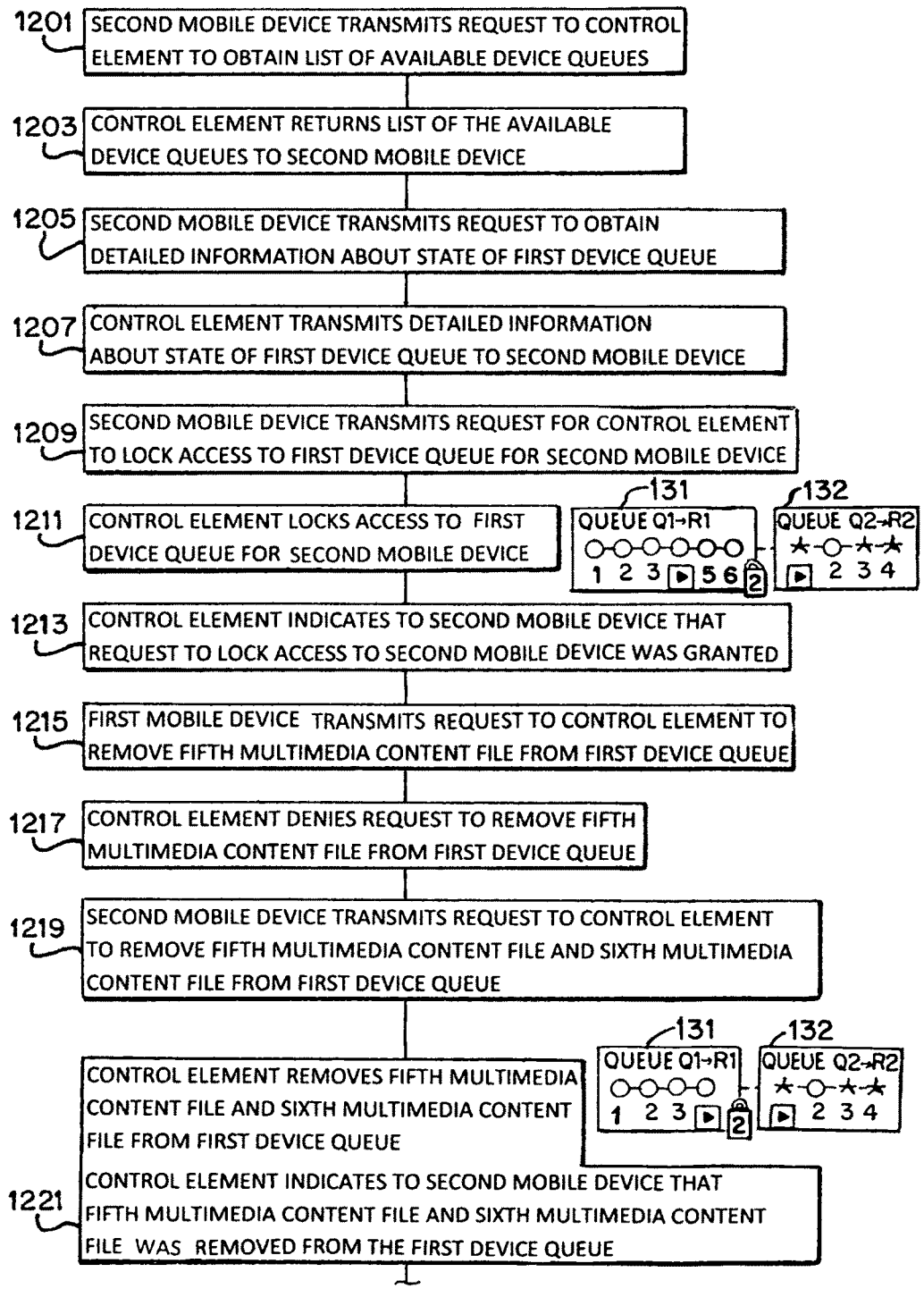

FIG. 12A cont.

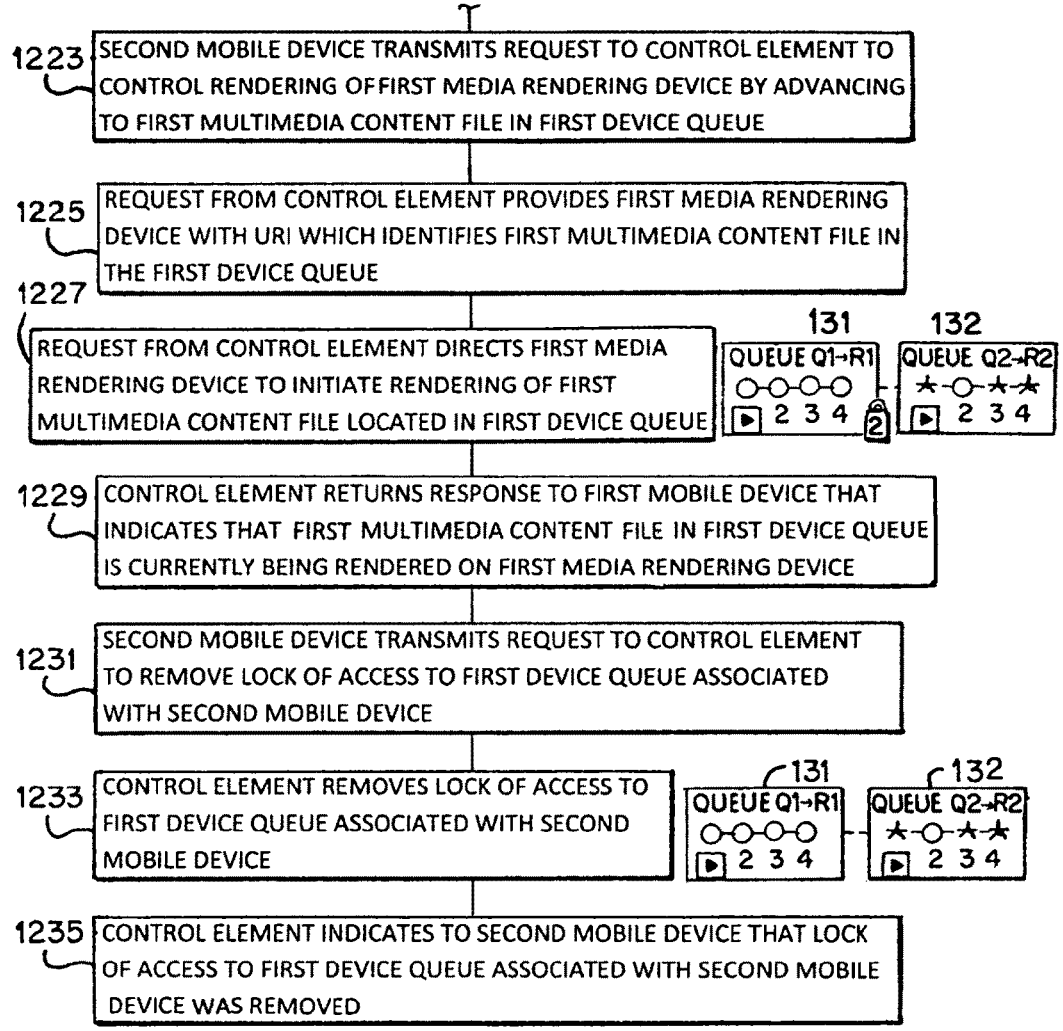

1223 — SECOND MOBILE DEVICE TRANSMITS REQUEST TO CONTROL ELEMENT TO CONTROL RENDERING OF FIRST MEDIA RENDERING DEVICE BY ADVANCING TO FIRST MULTIMEDIA CONTENT FILE IN FIRST DEVICE QUEUE

1225 — REQUEST FROM CONTROL ELEMENT PROVIDES FIRST MEDIA RENDERING DEVICE WITH URI WHICH IDENTIFIES FIRST MULTIMEDIA CONTENT FILE IN THE FIRST DEVICE QUEUE

1227 — REQUEST FROM CONTROL ELEMENT DIRECTS FIRST MEDIA RENDERING DEVICE TO INITIATE RENDERING OF FIRST MULTIMEDIA CONTENT FILE LOCATED IN FIRST DEVICE QUEUE

1229 — CONTROL ELEMENT RETURNS RESPONSE TO FIRST MOBILE DEVICE THAT INDICATES THAT FIRST MULTIMEDIA CONTENT FILE IN FIRST DEVICE QUEUE IS CURRENTLY BEING RENDERED ON FIRST MEDIA RENDERING DEVICE

1231 — SECOND MOBILE DEVICE TRANSMITS REQUEST TO CONTROL ELEMENT TO REMOVE LOCK OF ACCESS TO FIRST DEVICE QUEUE ASSOCIATED WITH SECOND MOBILE DEVICE

1233 — CONTROL ELEMENT REMOVES LOCK OF ACCESS TO FIRST DEVICE QUEUE ASSOCIATED WITH SECOND MOBILE DEVICE

1235 — CONTROL ELEMENT INDICATES TO SECOND MOBILE DEVICE THAT LOCK OF ACCESS TO FIRST DEVICE QUEUE ASSOCIATED WITH SECOND MOBILE DEVICE WAS REMOVED

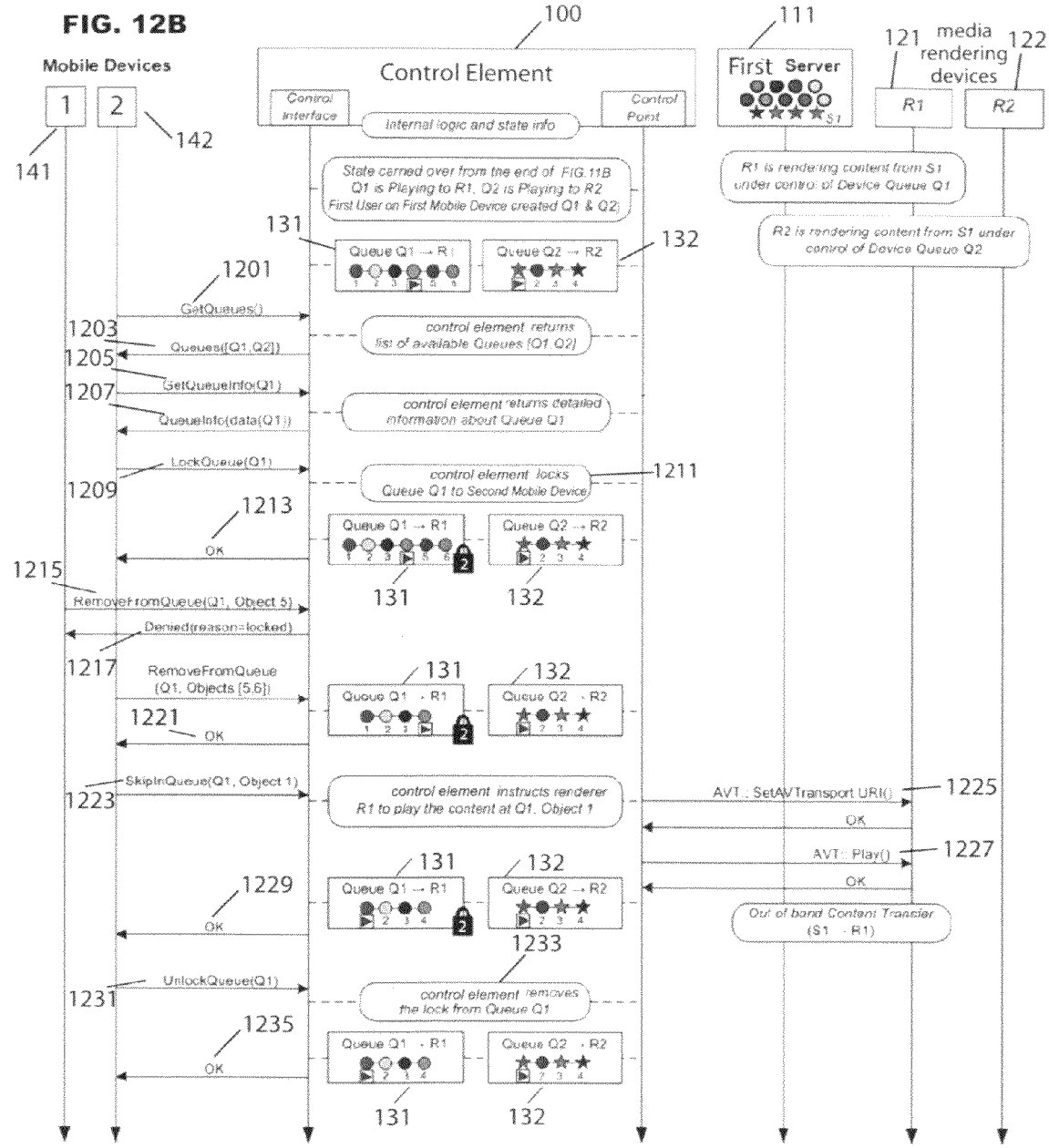

SYSTEM AND METHOD FOR CONTROLLING MEDIA RENDERING IN A NETWORK USING A MOBILE DEVICE

BACKGROUND OF THE INVENTION

The present invention generally relates to a system and a method for controlling media rendering in a network using a mobile device. More specifically, the present invention relates to a system and a method for managing, controlling and/or rendering media in a home network using remote access and/or a remote user interface. The system and the method enable a user to control media rendering from multiple storage devices and/or multiple servers connected to the home network using the mobile device. The system and the method enable a user to control media rendering on multiple rendering devices connected to the home network using the mobile device.

It is well known for a user to use multiple media servers and multiple media rendering devices to consume media objects in the home, such as, for example, audio files, video files, digital photographs and the like. For example, the media objects may be provided by media servers connected to a home network. The media objects may be stored on one or more of the media servers. The home network may also have various media rendering devices connected to the home network, such as, for example, stereos, televisions, personal computers, digital photo frames, other devices which have multimedia content rendering capability and the like. The user may browse the media objects remotely from one or more "control points" in the home network and may consume a specific media file on any compatible media rendering device connected to the home network.

The ability to organize, browse and consume media is enhanced by the availability of connection technologies, such as, for example, Universal Plug and Play ("UPnP") Audio and Video ("AV") standard and Digital Living Network Alliance ("DLNA") standard. These connection technologies allow distribution of multimedia content between various storage devices and associated media rendering devices in the home network. The UPnP AV standard defines a protocol by which the media servers and the media rendering devices may be connected, controlled and used to process and play the multimedia content. The DLNA standard provides additional details and conformance points to ensure that UPnP AV-based home networking products properly communicate and work together. Products based on the UPnP AV standard and the DLNA standard allow consumers to easily access, control, and enjoy the multimedia content using a multimedia-enabled home network.

A control point application is an application which controls UPnP compatible servers and UPnP compatible rendering devices. For example, a control point application may allow the user to find and/or browse multimedia content, such as a digital video file or a digital audio file, that is available from a particular UPnP server. The control point application may allow the user to transmit the multimedia content to a particular UPnP rendering device for consumption.

Typically, the media servers, the media rendering devices, the control points and other devices connected to the home network are connected via Ethernet/wired Local Area Network ("LAN"), IEEE 1394 ("FireWire"), IEEE 802.11 ("Wi-Fi") or other similar state of the art networking technologies. Mobile devices which interact with the home network are limited to wireless connection technology; therefore, the mobile devices must connect to the home network via a Wi-Fi connection. Typically, the home network also has an outside connection to the internet to enable personal computers and other devices connected to the home network to access outside content, such as, for example, web pages, multimedia files, other content available on the internet and the like.

A UPnP AV Control Point may reside on a PC, may be coupled with a media server, or may be built into a media rendering device. Alternatively, a UPnP AV Control Point may be located on a stand-alone device, such as, for example, a UPnP "Remote Control" device. To add UPnP AV Control Point functionality to personal mobile devices, the UPnP AV Control Point functionality may reside on a Personal Digital Assistant (PDA), a mobile phone, a portable video player, a portable gaming device or other mobile device. A standard UPnP AV Control Point may be added to any such mobile device which is capable of connecting to the home network. Thus, the UPnP AV Control Point is capable of communicating with the UPnP AV capable media servers and UPnP AV capable media rendering devices connected to the home network. However, the mobile device must have Wi-Fi connection capability to connect wirelessly to the home network. Therefore, a Wi-Fi connection is a requirement for any mobile device which supports standard UPnP AV Control Point functionality.

Typical communication paths used by a standard UPnP AV Control Point to control media streamed from a media server to a media rendering device connect the media server, the media rendering device and the control point. These typical communication paths use the home network to connect the media server, the media rendering device and the UPnP AV Control Point.

When using a standard UPnP AV Control Point, a control point user may browse multimedia content available on the media servers connected to the home network, may select and arrange media content objects for rendering, and may initiate and control rendering of selected multimedia content files on a selected media rendering device. The UPnP AV Control Point does not handle the multimedia content files directly. The UPnP AV Control Point requests metadata for the multimedia content files from the media servers and presents information provided by the metadata to the control point user. The control point user may use the information provided by the metadata to select one or more of the multimedia content files. Further, the UPnP AV Control Point provides an indirect reference, such as, for example, a Uniform Resource Locator ("URL"), to one of the media rendering devices to identify a specific multimedia content file which that media rendering device should render. The media rendering device is then responsible for requesting the multimedia content file directly from the media server on which the multimedia content file is stored.

Multimedia content files may be selected individually for rendering or may be placed in a "device queue" which is a list of multimedia content files. The device queue is used to transmit the multimedia content files located in the device queue to the selected media rendering device. The device queue is typically managed and maintained by the UPnP AV Control Point. The control point user has various remote-control options while the content is playing on the media rendering device, such as, for example, fast forward, rewind, pause, play, stop, volume control and the like. If the device queue is employed, the control point user has additional options to manage the device queue, such as, for example, to change an order or an arrangement of the multimedia content files, to add a multimedia content file to the device queue, to delete a multimedia content file from the device queue, to advance to a different multimedia content file within the device queue and the like.

The control point user may select a media rendering device and may instruct the UPnP AV Control Point to render contents of the device queue on the media rendering device. The UPnP AV Control Point may instruct the media rendering device to play each of the media content objects located in the device queue in sequence. The device queue is presented to the control point user as a temporary list of multimedia content files which are currently being consumed on the selected media rendering device.

While the media rendering device is rendering the media content object, the UPnP AV Control Point may, under the control of the control point user, exercise additional controls over the rendering, such as, for example, fast-forward, reverse, pause, play, stop, volume control and the like. In addition, the UPnP AV Control Point may exercise additional controls over the device queue, such as, for example, advance to the next media content object in the device queue, advance to the previous media content object in the device queue and the like.

SimpleCenter (registered trademark of Universal Electronics, Inc.), Nokia (registered trademark of Nokia Corporation) UPnP functional mobile devices, and Rudeo Play & Control on a PocketPC device (trademarks of Rudeo Consulting) are examples of UPnP AV Control Points. SimpleCenter is Windows PC software which implements a UPnP Control Point, as well as media server and media rendering device capabilities. Certain Nokia mobile phones, such as the N80 mobile phone and the N95 mobile phone, and a Nokia tablet device, the N800 Internet Tablet, have a standard UPnP Control Point located on the mobile device. Rudeo Play & Control is an add-on software product which implements a UPnP AV Control Point on the PocketPC device. Rudeo Play & Control has a standard UPnP AV Control Point with additional proprietary enhancements that are described hereafter.

UPnP AV communication protocols operate based on an assumption that a device that hosts a UPnP AV Control Point will always be powered "on" and always connected to the home network. UPnP defines an eventing framework; thus, media servers and media rendering devices may periodically transmit event messages, such as, for example, a message that indicates that a device becomes available in the home network or a message that indicates play status. For example, the message that indicates play status may be transmitted when a media rendering device has finished rendering a multimedia content file.

If the device that hosts the UPnP AV Control Point is not always powered "on" or always connected to the home network, then the UPnP AV Control Point may miss events which may need to be addressed to maintain or to control operation. UPnP AV rendering devices are simple in that they handle only one multimedia content file at a time. Thus, a UPnP AV Control Point which has device queue capability must monitor rendering by a media rendering device. When the media rendering device completes the rendering of one multimedia content file in the device queue, the UPnP AV Control Point may then inform the target media rendering device of the next multimedia content file to render. The UPnP AV Control Point manages the device queue and must continuously direct the media rendering device.

If a UPnP AV Control Point loses connection to the home network, then the device queue which the control point user has established will cease to be maintained, and the media rendering device will have no instructions on how to continue rendering the multimedia content files located in the device queue. When rendering of a current device queue object is completed, the rendering will stop which is problematic for a UPnP AV Control Point that resides on a mobile device.

Mobile devices are unreliable for hosting a UPnP AV Control Point because they may be powered "off", may utilize battery power so that insufficient battery power remains, or may be moved to a location outside of Wi-Fi connection range.

For example, the control point user may employ the UPnP AV Control Point of a Nokia N800 mobile phone to play a device queue of selected music tracks from a UPnP AV Media Server to a UPnP AV capable home stereo. If the N800 device is powered "off", utilizes battery power so that insufficient battery power remains and/or is moved to a location outside of Wi-Fi connection range, then the home stereo will cease rendering at the end of the current music track.

Rudeo Play & Control presents a solution to this problem. An associated PC application, a Play & Control Media Server, is provided. The Play & Control Media Server is capable of hosting the device queue. The control point user may create, manage and use a device queue from the user interface of the Play & Control client on a PocketPC mobile device. The device queue may be hosted on a PC connected to the home network, where the PC executes the associated server application. In this case, the device queue is created and controlled remotely by commands sent from the PocketPC mobile device to the PC server application. The PC server application is responsible for transmitting periodic commands to the media rendering device to continue rendering the contents of the device queue. Therefore, the device queue continues to be rendered even if the mobile device is powered "off", utilizes battery power so that insufficient battery power remains or moves to a location outside of Wi-Fi range.

The mobile control point client of Rudeo Play & Control functions as a standard UPnP AV Control Point when the PC server application is not present or when the control point user chooses to not utilize the PC server application. The mobile control point client manages the device queue internally as previously set forth for a standard UPnP AV Control Point if the PC server application is not present or the control point user chooses to not utilize the PC server application. If the PC server application is present, the mobile control point client uses a combination of standard UPnP AV protocols and proprietary protocols. For example, the mobile control point client uses a standard UPnP AV protocol to directly browse media servers for content or to directly control the media rendering device for non-queue related tasks, and uses a proprietary protocol to create, manage and control the device queue hosted by the proprietary PC server application. Direct communication with the home network is required; therefore, Rudeo's Mobile Control Point client requires that the PocketPC mobile device that hosts the mobile control point has Wi-Fi connection capability.

Existing mobile UPnP AV Control Points are limited to devices with Wi-Fi connection capabilities which is disadvantageous because many mobile devices do not have Wi-Fi connection capabilities. In addition, mobile devices that do have Wi-Fi connection capabilities tend to be high-end devices, such as business phones and PDAs, which are relatively expensive and are produced and sold in low volumes. More popular, lower-cost devices, such as mid- to low-end mobile phones, do not typically have Wi-Fi connection capabilities which prevents these mobile devices from hosting control point functionality.

Further, existing mobile UPnP AV Control Points must have specialized software installed on the mobile device, such as, for example, a UPnP stack and an associated Control Point application. The specialized software is required for the mobile device to communicate directly with UPnP compliant media servers and UPnP compliant media rendering devices connected to the home network. Requirement of the specialized software is disadvantageous because a provider must produce many variants of the specialized software to support a variety of mobile devices. Production of the variants of the specialized software burdens the provider of control point software with additional cost and effort. Furthermore, the specialized software may not be able to be installed on the mobile device when the mobile device is originally sold to the user. The user must then obtain and install the correct variant of the specialized software on the mobile device. Many users will not make use of the specialized software if effort is required to obtain and install the specialized software.

Still further, existing mobile UPnP AV Control Points have been limited to one device queue that directs multimedia content to one media rendering device at a time. However, most multimedia-capable home networks have a variety of media rendering devices.

Moreover, existing mobile UPnP AV Control Points limit use and control of the device queue to the control point and associated control point user which created the device queue. Control of a device queue is not shared between multiple users on different mobile devices. However, the media rendering devices connected to the home network are typically shared between multiple residents of the home, and each resident may have a different mobile device which may be used to control rendering of the multimedia content. For example, User B may enter a room of the home and find a digital stereo already playing a queue of music content previously created by User A using a mobile control point on a mobile device owned by User A. User B may wish to see what music content is queued on the digital stereo or may wish to control or edit that music content. However, User B typically does not have access to view, edit, control or manage the queue from which the music content is playing since that queue is under the control and ownership of the mobile control point that resides on the mobile device of User A.

A need, therefore, exists for a system and a method for controlling media rendering in a network using a mobile device. Further, a need exists for a system and a method for managing, controlling and/or rendering media in a home network using remote access and/or a remote user interface. Still further, a need exists for a system and a method for controlling media rendering in a network using a mobile device that enable a user to control media rendering from multiple storage devices and/or multiple servers in the network. Still further, a need exists for a system and a method for controlling media rendering in a network using a mobile device that enable a user to control media rendering on multiple rendering devices connected to the home network using the mobile device. Still further, a need exists for a system and a method for controlling media rendering in a network that use a mobile device as a control point in the network without the need for specialized software to be installed on the mobile device. Still further, a need exists for a system and a method for controlling media rendering in a network using a mobile device that enables a single control point to create, control, manage, and render content from multiple device queues wherein each device queue transmits media content to a different selected media rendering device. Moreover, a need exists for a system and a method for controlling media rendering in a network using a mobile device that allows device queues to be shared between multiple users in a home network.

SUMMARY OF THE INVENTION

The present invention generally relates to a system and a method for controlling media rendering in a network using a mobile device. More specifically, the present invention relates to a system and a method for managing, controlling and/or rendering media in a home network using remote access and/or a remote user interface. The system and the method enable a user to control media rendering from multiple storage devices and/or multiple servers connected to the home network using the mobile device. The system and the method enable a user to control media rendering on multiple rendering devices connected to the home network using the mobile device.

It is, therefore, an advantage of the present invention to provide a system and a method for controlling media rendering in a network using a mobile device.

Another advantage of the present invention is to provide a system and a method for managing, controlling and/or rendering media in a network using remote access.

And, another advantage of the present invention is to provide a system and a method for managing, controlling and/or rendering media in a network using a remote user interface.

Yet another advantage of the present invention is to provide a system and a method for controlling media rendering in a network using a mobile device that enable a user to control media rendering from multiple storage devices and/or multiple servers in the network.

Still further, an advantage of the present invention is to provide a system and a method for controlling media rendering in a network that use a mobile device as a control point in the network without the need for specialized software to be installed on the mobile device.

Yet another advantage of the present invention is to provide a system and a method for controlling media rendering in a network using a mobile device that enables device queues to be shared between multiple users in a home network.

Still further, an advantage of the present invention is to provide a system and a method for controlling media rendering in a network using a mobile device that have an always-on, always-available control element located in the multimedia-capable home network.

And, another advantage of the present invention is to provide a system and a method for controlling media rendering in a network using a mobile device that have a control element hosted on a fixed, non-mobile device connected directly to the home network.

Still further, an advantage of the present invention is to provide a system and a method for controlling media rendering in a network using a mobile device that have a control element capable of communicating with and controlling standard UPnP AV media servers and standard UPnP AV media rendering devices in the home network.

Another advantage of the present invention is to provide a system and a method for controlling media rendering in a network using a mobile device that enables multiple device queues to be created, managed, controlled, and rendered independently to different media rendering devices connected to the home network.

Yet another advantage of the present invention is to provide a system and a method for managing, controlling and/or rendering media in a network that expose control interfaces that enable one or more mobile devices to control functional capabilities of a control element.

Still further, an advantage of the present invention is to provide a system and a method for managing, controlling and/or rendering media in a network that enables a mobile device to control media servers, media rendering devices and device queues entirely via a control interface between the mobile device and a control element.

And, another advantage of the present invention is to provide a system and a method for controlling media rendering in a network using a mobile device that does not require the mobile device to have direct communication with the home network or with the media servers and media rendering devices connected to the home network.

Moreover, an advantage of the present invention is to provide a system and a method for managing, controlling and/or rendering media in a network that expose control interfaces via any available connection by which the control element may communicate with the mobile device.

Additional features and advantages of the present invention are described in, and will be apparent from, the detailed description of the presently preferred embodiments and from the drawings.

BRIEF DESCRIPTION OF THE DRAWINGS

FIG. 3 illustrates typical operation of a Rudeo Play & Control system.

FIG. 4 illustrates a system for controlling media rendering in a network using a mobile device in an embodiment of the present invention.

FIG. 5 illustrates a system for controlling media rendering in a network using a mobile device in an embodiment of the present invention.

FIG. 6 illustrates a session between a mobile device and a control element in an embodiment of the present invention.

FIGS. 8A, 8B, 9A, 9B, 10A, 10B, 11A, 11B, 12A and 12B illustrate flowcharts for controlling media rendering in a network using a mobile device in an embodiment of the present invention.

DETAILED DESCRIPTION OF THE PREFERRED EMBODIMENTS

The present invention generally relates to a system and a method for controlling media rendering in a network using a mobile device. More specifically, the present invention relates to a system and a method for managing, controlling and/or rendering media in a home network using remote access and/or a remote user interface. The system and the method enable a user to control media rendering from multiple storage devices and/or multiple servers in the network using a mobile device. The system and the method enable a user to control media rendering on multiple rendering devices connected to the home network using the mobile device. The system and the method for controlling media rendering in a network may use a mobile device as a control point in the network without the need for specialized software to be installed on the mobile device.

The system and the method enable the user of the mobile device to create, control, manage, and render content from multiple device queues wherein each device queue may be used to transmit media content to a different selected media rendering device. The device queues may be shared between multiple users and/or multiple mobile devices. A control element may be connected to the network as a stand-alone device. Alternatively, the control element may be hosted on a fixed, non-mobile device connected directly to the home network. The control element may be controlled by one or more mobile devices which communicate with the control element. The control element communicates with and/or controls standard UPnP AV media servers and standard UPnP AV media rendering devices connected to the home network.

Figure 1:
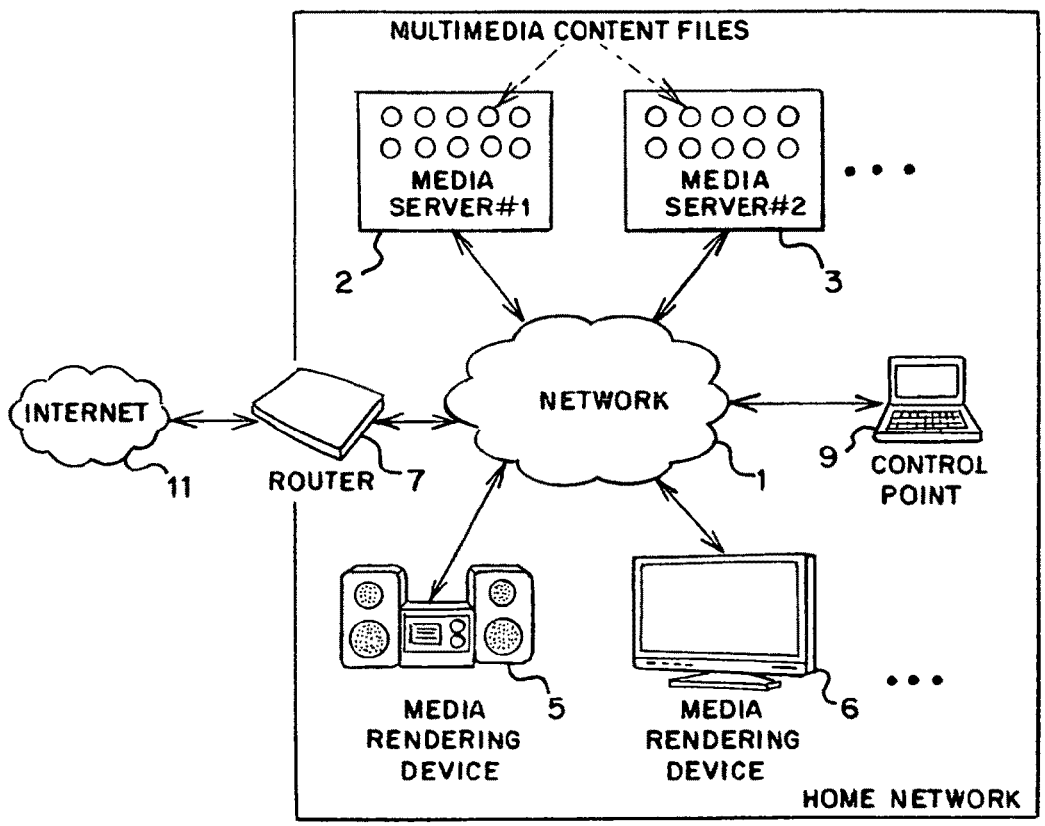
FIG. 1 illustrates a typical configuration for a multimedia-capable home network.

Referring now to the drawings wherein like numerals refer to like parts, FIG. 1 generally illustrates a typical configuration for a multimedia-capable home network. The home network may include a network 1 which may be connected to a first media server 2, a second media server 3, a UPnP AV Control Point 9 (hereinafter "control point 9"), a first media rendering device 5, a second media rendering device 6 and/or a router 7. The router 7 may connect the network 1 to the Internet 11. The network 1 may be, for example, an IEEE 802.11 ("Wi-Fi") network, an Ethernet/wired Local Area Network ("LAN"), an IEEE 1394 ("Fire Wire") network and/or a hybrid network using a combination of such technologies. The control point 9 may be hosted on a device connected to the network 1, such, for example, a personal computer ("PC"). The control point 9 may hosted on another device, such as, for example, a media server, a media rendering device and/or a stand-alone UPnP remote control device. The first media server 2 and/or the second media server 3 may store multimedia content files, such as, for example, audio files, video files, digital photographs and/or the like.

A user of the control point 9 may browse the multimedia content files available on the first media server 2 and/or the second media server 3, may select and/or may arrange the multimedia content files for rendering, and/or may initiate and/or may control rendering of selected multimedia content files on the first media rendering device 5 and/or the second media rendering device 6. The control point 9 may request metadata for the multimedia content files from the first media server 2 and/or the second media server 3 and/or may present information provided by the metadata to the user of the control point 9. The information presented to the user may allow the user to select one or more of the multimedia content files. Further, the control point 9 may provide an indirect reference, such as, for example, a URL, to the first media rendering device 5 and/or the second media rendering device 6 to identify a specific multimedia content file which the first media rendering device 5 and/or the second media rendering device 6, respectively, should render. The first media rendering device 5 and/or the second media rendering device 6 may then request the multimedia content file directly from the first media server 2 and/or the second media server 3.

Figure 2:
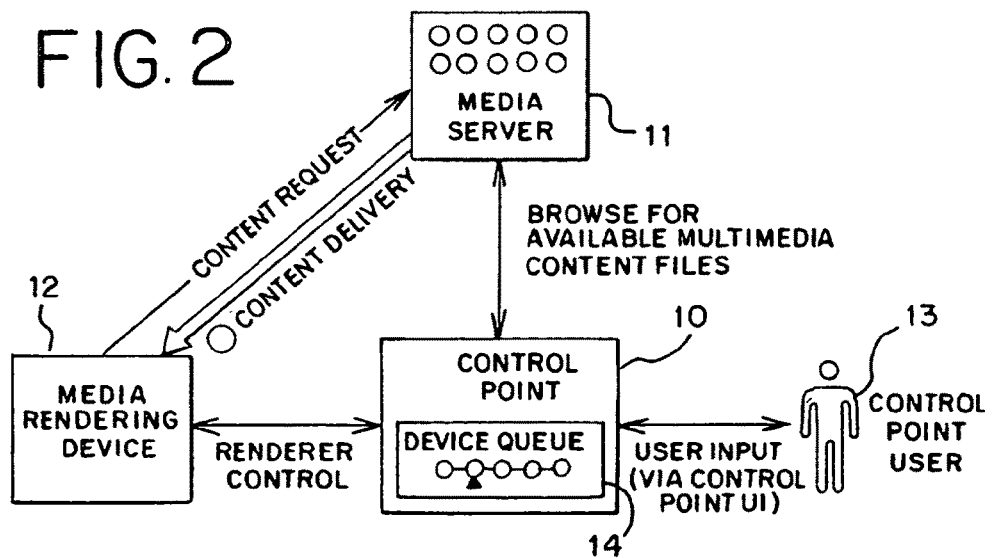
FIG. 2 illustrates communication paths used by a standard UPnP AV Control Point.

FIG. 2 generally illustrates communication paths used by a standard UPnP AV Control Point 10 (hereinafter "control point 10") to control media streamed from a media server 11 to a media rendering device 12. Each of the communication paths between the media server 11, the media rendering device 12 and the control point 10 may utilize the home network. Under the control of a control point user 13, the control point 10 may browse the media server 11 to determine available multimedia content. The control point user 13 may select multimedia content files to be rendered. References to the selected multimedia content files may be placed in a device queue 14 that may be located in the control point 10. For brevity, we hereinafter refer to the multimedia content files as "located in the device queue 14" even though the device queue 14 may have references to the multimedia content files and/or metadata associated with the multimedia content files instead of the multimedia content files themselves.

The control point user 13 may manage the device queue 14 to add a multimedia content file to the device queue 14, to delete a multimedia content file from the device queue 14 and/or to rearrange an order of the multimedia content files located in the device queue 14. The control point user 13 may select the media rendering device 12 and/or may instruct the control point 10 to render contents of the device queue 14 on the media rendering device 12. The control point 10 may instruct the media rendering device 12 to play each of the multimedia content files located in the device queue 14 in sequence.

For each multimedia content file located in the device queue 14, the control point 10 may provide the media rendering device 12 with a URL that may be associated with a corresponding multimedia content file that may be stored on the media server 11. The media rendering device 12 may then contact the media server 11 directly to obtain the corresponding multimedia content file for rendering. When the media rendering device 12 is rendering the multimedia content file, the control point 10 may, under control of the control point user 13, exercise additional controls over rendering, such as, for example, fast-forward, reverse, pause, play, stop, volume control and the like. In addition, the control point 10 may, under control of the control point user 13, exercise additional controls over the device queue 14, such as, for example, advance to the next multimedia content file in the device queue 14 and/or advance to the previous multimedia content file in the device queue 14.

FIG. 3 generally illustrates operation of a Rudeo Play & Control system 49. A PC server application 51 may be hosted on a Windows PC 60 (registered trademark of Microsoft Corporation). A Rudeo Play & Control mobile control point 50 (hereinafter "mobile control point 50") may function as a standard UPnP AV Control Point if the PC server application 51 is not present and/or if a control point user 52 chooses to not utilize the PC server application 51. When functioning as a standard UPnP control point, the mobile control point 50 may manage a device queue 14 internally, similar to the device queue 14 managed by the standard UPnP AV Control Point 10 shown in FIG. 2.

If the PC server application 51 is present, the mobile control point 50 may utilize a combination of standard UPnP AV protocols and proprietary protocols. For example, the mobile control point 50 may use a standard UPnP AV protocol to directly browse a media server 54 for content and/or to directly control a media rendering device 55 for non-queue related tasks, and may use a proprietary protocol to create, manage and/or control the device queue 53 hosted by the proprietary PC server application 51. Direct communication with the home network is required, so Rudeo's Mobile Control Point client requires that the PocketPC mobile device that hosts the mobile control point 50 has Wi-Fi connection capability.

FIG. 4 generally illustrates a system 90 for controlling media rendering in a network using a mobile device in an embodiment of the present invention. The system 90 may have a control element 100 which may allow a first user 91, a second user 92 and/or a third user 93 to access, manage, organize and/or consume multimedia content files which are distributed throughout the network. The control element 100 may be hosted on a desktop personal computer (PC), a laptop PC, a Network-Attached Storage (NAS) device, a router, a media server, a media rendering device and/or the like. Alternatively, the control element 100 may be a stand-alone device that may connect to the network.

A first media server 111, a second media server 112 and/or a third media server 113 (collectively "the media servers 111, 112, 113") may be connected to the control element 100 via the network. A first media rendering device 121, a second media rendering device 122 and/or a third media rendering device 123 (collectively "the media rendering devices 121, 122, 123") may be connected to the control element 100 via the network. The media servers 111, 112, 113 may be connected to the media rendering devices 121, 122, 123 via the network. The control element 100 may be connected to the media servers 111, 112, 113 and/or the media rendering devices 121, 122, 123 via the network. The control element 100 may be capable of communicating with and/or controlling the media servers 111, 112, 113 and/or the media rendering devices 121, 122, 123.

In a preferred embodiment, the network may be a home network. The network may have connections that are wired and/or wireless. The network may be based on one or more of the following technologies: Ethernet/wired LAN, Fire Wire and/or Wi-Fi. The network may utilize other technologies not listed herein. The present invention is not limited to a specific embodiment of the network.

The media servers 111, 112, 113 and/or the media rendering devices 121, 122, 123 may be compliant to DLNA standards and/or UPnP AV standards. The system 99 may have at least one media server and at least one media rendering device. The system 99, however, does not have an upper limit to a number of media servers and/or a number of media rendering devices which may be accessible via the network. The present invention is not limited to a specific number of the media servers and/or the media rendering devices.

Each of the media servers 111, 112, 113 may be, for example, a personal computer ("PC") which may have software which may implement a DLNA-compliant AV Server; a Network Attached Storage ("NAS") device which may have DLNA-compliant AV server capability; a Digital Video Recorder ("DVR") which may have DLNA-compliant AV server capability; a portable computing device, such as a mobile telephone or a Personal Digital Assistant ("PDA"), which may have DLNA-compliant AV server capability; and/or a media capture device, such as a digital still camera or a camcorder, which may have DLNA-compliant AV server capabilities. The present invention is not limited to a specific embodiment of the media servers 111, 112, 113.

Each of the media rendering devices 121, 122, 123 may be, for example, a DLNA-compliant television; a DLNA-compliant set-top box connected to a television which may or may not be DLNA-compliant; a DLNA-compliant Stereo System; a DLNA-compliant audio adapter device connected to a stereo which may or may not be DLNA-compliant; a PC which may have media player software which may have DLNA-compliant rendering capability; a portable computing device, such as, for example, a mobile telephone or a Personal Digital Assistant ("PDA") which may have DLNA-compliant rendering capability; a DLNA-compliant photo display frame; and/or a video game console which may have UPnP technology. The present invention is not limited to a specific embodiment of the media rendering devices 121, 122, 123.

Each of the media servers 111, 112, 113 may store the multimedia content files and/or may access externally stored multimedia content. For example, a media server may have access to a remotely accessible multimedia content file, a content stream and/or a content feed via a content service which the media server may access using the Internet. The media server may provide availability of the externally stored multimedia content, such as, for example, the remotely accessible multimedia content file, the content stream and/or the content feed, to media rendering devices and/or other devices connected to the network. The present invention is not limited by the location in which multimedia content is stored, and may utilize multimedia content made available via a media server.

Each of the media servers 111, 112, 113 may provide the multimedia content files to the media rendering devices 121, 122, 123. The multimedia content files may be simple media objects, such as, for example, a video clip, a music track and/or a digital photograph, may be pre-defined composite objects, such as, for example, a television series and/or a music album, and/or may be compilation objects which the user has previously defined, such as, for example, a music playlist and/or a photo slide show. The present invention is not limited to a specific embodiment or type of the multimedia content files.

The control element 100 may expose one or more control interfaces. Each of the control interfaces may allow one or more mobile devices to control functional capabilities of the control element 100 which may have standard UPnP AV Control Point capabilities and/or enhanced device queue capabilities as described hereafter.

The standard UPnP AV Control Point capabilities may be, for example, communicating with and/or controlling standard UPnP media servers and standard UPnP media rendering devices. Thus, the control element 100 may communicate with and/or may control the media servers 111, 112, 113 and/or the media rendering devices 121, 122, 123.

The enhanced device queue capabilities may be, for example, creating, managing, controlling and/or rendering multiple device queues independently to different media rendering devices connected to the network. Thus, the control element 100 may enable a first device queue 131, a second device queue 132 and/or a third device queue 133 (collectively "the device queues 131, 132, 133") to be created, managed, controlled, and/or rendered independently to the media rendering devices 121, 122, 123. Each of the device queues 131, 132, 133 may be associated with a target media rendering device. For example, as generally illustrated in FIG. 4, the first device queue 131 may be associated with the first media rendering device 121; the second device queue 132 may be associated with the third media rendering device 123; and/or the third device queue 133 may be associated with the third media rendering device 122.

A first mobile device 141, a second mobile device 142 and/or a third mobile device 143 (collectively "the mobile devices 141, 142, 143") may be connected to the control element 100 by a first exposed control interface 151, a second exposed control interface 152 and/or a third exposed control interface 153 (collectively "the control interfaces 151, 152, 153"), respectively. The control interfaces 151, 152, 153 may be exposed via any available connection by which the control element 100 may communicate with the mobile devices 141, 142, 143. Each of the mobile devices 141, 142, 143 may be, for example, a mobile cellular telephone, a personal digital assistant ("PDA"), a 4G mobile device, a 3G mobile device, a 2.5G mobile device, an internet protocol (hereinafter "IP") video cellular telephone, an ALL-IP electronic device, a satellite radio receiver, a portable digital audio player, a portable digital video player, a laptop PC, a portable gaming device and/or the like.

The system 99 does not have an upper limit to a number of device queues which may be created by the control element 100. The present invention is not limited to a specific number of the device queues. In addition, the system 99 does not have an upper limit to a number of mobile devices which may be connected to the control element 100. The present invention is not limited to a specific number of the mobile devices.

Each of the control interfaces 151, 152, 153 may enable each of the mobile devices 141, 142, 143, respectively, to control the media servers 111, 112, 113, the media rendering devices 121, 122, 123 and/or the device queues 131, 132, 133 via the specific control interface between the specific mobile device and the control element 100. Thus, communication between the specific mobile device and the control element 100 may be sufficient to enable control of functionality of the control element 100. The mobile devices 141, 142, 143 may not require direct communication with the network, the media servers 111, 112, 113 and/or the media rendering devices 121, 122, 123. Thus, each of the mobile devices 141, 142, 143 may not be directly connected to the network. Furthermore, the mobile devices 141, 142, 143 may not require support for standard UPnP protocols.

Particular capabilities of each of the mobile devices 141, 142, 143 may determine whether the specific mobile device is directly connected to the network. For example, a mobile device which is not capable of Wi-Fi connection may not connect directly to the network. The mobile device which is not capable of Wi-Fi connection may use an alternative connection technology, such as, for example, a Bluetooth (trademark of Bluetooth, Inc.) wireless connection or a mobile phone carrier network. The mobile phone carrier network may be, for example, a 2.5G cellular network, a 3G cellular network, a 4G data cellular network, a IEEE 802.16 ("WiMax") network and/or the like. For example, if the mobile device is a Wi-Fi equipped mobile phone, a Wi-Fi equipped PDA, a Wi-Fi equipped mobile video player and/or a Wi-Fi equipped portable gaming device, the mobile device may communicate with the control element 100 using a Wi-Fi connection. As a further example, if the mobile device is a mobile phone that may support a Bluetooth connection, the mobile device may communicate with the control element 100 using the Bluetooth connection. As yet another example, if the mobile device is a mobile phone which may be capable of supporting a packet data connection over a mobile phone carrier network, the mobile device may communicate with the control element 100 using the mobile phone carrier network. Additional details for these connection methods will be provided hereafter.

The control interface may allow control of the control element 100 by a specialized software application installed on the mobile devices 141, 142, 143. Alternatively, the control interface may allow control of the control element 100 via standard software that may be present on the mobile devices 141, 142, 143. Such standard software may be, for example, an HTML web browser, an XHTML web browser, a JavaScript interpreter, a Java virtual machine, a Flash Player and/or the like. In these cases, the control interface may be designed and/or formatted for compatibility with specific standard software modules. For example, the control element 100 may expose a control interface based on XHTML web pages supplemented with JavaScript. As another example, the control element 100 may expose a Flash (.swf) file having ActionScript code which may implement a user interface on the mobile device and/or which may be capable of communicating with and/or controlling the control element 100.

As generally illustrated in FIG. 5, the control element 100 may expose the control interfaces 151, 152, 153 to connect to the mobile devices 141, 142, 143 which may then control functions that may be provided by the control element 100. Each of the control interfaces 151, 152, 153 may be associated with a first data connection 161, a second data connection 162 and/or a third data connection 163 (collectively "the data connections 161, 162, 163"), respectively, for which an associated mobile device has connection capability. A description of the control interfaces 151, 152, 153 and a description of specific adaptations to connection technologies will be provided hereafter.

The control element 100 may have a core component 101 that may have core logic for functionality that may be offered by the control element 100. Therefore, the core component 101 may manage functions of the control element 100. The core component 101 may serve as a proxy for standard UPnP AV commands and/or standard UPnP AV functions offered to the mobile devices 141, 142, 143 via the control interfaces 151, 152, 153, respectively. Thus, the core component 101 may allow mobile devices which are unable to directly connect to the network to exercise standard UPnP AV control point functionality. The core component 101 may provide enhanced device queue functions. Thus, the core component 101 may enable a user to utilize one of the mobile devices 141, 142, 143 to create, edit, and manage the device queues 131, 132, 133 and/or to control rendering of multimedia content of the device queues 131, 132, 133 by one or more of the media rendering devices 121, 122, 123 that may be selected.

The core component 101 may manage device queue rendering by associated media rendering devices. Thus, the mobile device may not need to directly communicate with the selected media rendering device. Device queue rendering may continue if the mobile device is not available. The core component 101 may enable sharing of one or more of the device queues 131, 132, 133 between two or more of the mobile devices 141, 142, 143. The core component 101 may establish provisions for queue discovery, for access control and/or for conflict avoidance.

The core component 101 may manage a session with one of the mobile devices 141, 142, 143. The session may track a control relationship between one of the mobile devices 141, 142, 143 and the control element 100. The session may have a session state associated with the control relationship. Each of the mobile devices 141, 142, 143 may have a single session with the control element 100 or may have multiple simultaneous sessions. Each of the multiple simultaneous sessions may be associated with an independent session state. A unique session identifier may be used to identify each of the multiple simultaneous sessions. Session management may involve automatic saving and/or automatic recovery of the session state to overcome interruptions in connection between the control element 100 and the corresponding mobile device.

The core component 101 may perform a master control element selection process by which the core component 101 may detect that multiple control elements 100 may be connected to the network. The core component 101 may select a single master control element that may override actions of other control elements 100 that may be connected to the network. The master control element may have superiority over the other control elements 100 that may be connected to the network.

The control element 100 may have a storage component 102. The core component 101 may be connected to the storage component 102. The core component 101 may use the storage component 102 to store information about the device queues 131, 132, 133 and/or the session states of sessions associated with specific mobile devices. The storage component 102 may have a list of the device queues 131, 132, 133 that are available. For each of the device queues 131, 132, 133 that are available, the storage component 102 may have a unique identifier for the specific device queue, an ordered list of the multimedia content files located in the specific device queue, the media rendering device, if any, associated with the specific device queue, a current playback state of the specific device queue, a reference to a session which created and/or which is associated with the specific device queue, a reference to the specific mobile device which created and/or which is associated with the specific device queue, a reference to the user which created and/or which is associated with the specific device queue, and/or an indication of whether access to the specific device queue is locked to a particular session, a particular mobile device and/or a particular user.

For each multimedia content file located in the device queue, the storage component 102 may have a reference to the specific media server from which the multimedia content file may be retrieved, metadata which may describe the multimedia content file, a URL which may reference the multimedia content file and/or a "selected" status for the multimedia content file. The "selected" status for the multimedia content file may be "yes" or "no". The metadata which may describe the multimedia content file may indicate, for example, a media type, a Multipurpose Internet Mail Extension ("MIME") type, a title, an author, an album name, a content rating, a copyright date, a reference to an associated graphic display icon and/or the like. For example, the media type may be audio, video, image and/or the like.

For the session states, the storage component 102 may have a list of known sessions. For each of the known sessions, the storage component 102 may have, for example, a unique session identifier for the session, a unique device identifier for the media rendering device associated with each session, a unique user identifier for the user associated with the session, a default media server, a default media rendering device, a list of associated device queues, a reference to a default device queue, a command history that may list one or more commands that may be associated with the session, a time at which a recent command was received, a list of events which may be related to the session and/or additional state information associated with the session.

The control element 100 may have a control point component 103 that may provide standard UPnP AV Control Point functionality that may be controlled by the core component 101. The control point component 103 may communicate with standard UPnP media servers, standard UPnP media rendering devices and/or other UPnP compatible devices connected to the network. For example, the control point component 103 may communicate with the media servers 111, 112, 113 and/or the media rendering devices 121, 122, 123. The control point component 103 may connect to the network using a fourth data connection 164. The control point component 103 may communicate with the standard UPnP AV media servers, the standard UPnP AV media rendering devices and/or the other UPnP AV compatible devices connected to the network using the fourth data connection 164.

The control point component 103 may use a standard UPnP AV discovery process to discover the standard UPnP AV media servers, the standard UPnP AV media rendering devices and/or the other UPnP AV compatible devices connected to the network. The control point component 103 may report information to the core component 101 about which of the standard UPnP AV media servers, the standard UPnP AV media rendering devices and/or the other UPnP AV compatible devices connected to the network are available. The control point component 103 may discover other control elements 100 that may be connected to the network. The control point component 103 may report the other control elements 100 that may be connected to the network to the core component 101 which may then execute the master control element selection process to select the master control element.

A session between a mobile device 200 and the control element 100 may occur as generally illustrated in FIG. 6. The mobile device 200 may connect to the control element 100 using an associated data connection 201 and/or an associated control interface 202. The core component 101 may create a session in the storage component 102 to record a state for the session between the control element 100 and the mobile device 200. The core component 101 may then record and/or may retrieve details about the session when subsequently interacting with the mobile device 200. The mobile device 200 may limit itself to a single concurrent session with the control element 100, or the mobile device 200 may be capable of opening multiple concurrent sessions with the core component 101.

Although FIG. 6 only depicts one mobile device, one data connection and one control interface, the control element 100 may expose one or more control interfaces and each of the control interfaces may allow one or more mobile devices to control functional capabilities of the control element 100 as previously set forth. Multiple control interfaces, multiple data connections and multiple mobile devices may be employed in the embodiment of the present invention generally illustrated in FIG. 6.

A user may utilize the mobile device 200 to transmit commands to the control element 100. The commands may cause the control element 100 to transmit standard UPnP Control Point commands to standard UPnP AV media servers 210 connected to the network and/or standard UPnP AV media rendering devices 220 connected to the network 205. The control element 100 may return information that may be about results of the commands to the mobile device 200. Therefore, the control element 100 may act as a Control Point Proxy that may allow the mobile device 200 to have standard UPnP AV Control Point functionality without a direct connection to the standard UPnP AV media servers 210 connected to the network and/or the standard UPnP AV media rendering devices 220 connected to the network.

The user may utilize the mobile device 200 to transmit a command to the core component 101 using the associated data connection 201 and/or the associated control interface 202. The core component 101 may interpret the command and/or may instruct the control point component 103 to transmit appropriate UPnP Control Point commands to appropriate UPnP AV devices connected to the network 205 using the fourth data connection 164. The appropriate UPnP AV devices may return information using standard responses to the control point component 103 using the fourth data connection 164. The control point component 103 may report the information to the core component 101 which may then provide the information to the mobile device 200 via the associated control interface 202 and/or the associated data connection 201.

The following are typical command exchanges in which the control element 100 may act as the Control Point Proxy for standard UPnP Control Point functionality. The user may utilize the mobile device 200 to request that the control element 100 provide a list of known media servers connected to the network and/or a list of known media rendering devices connected to the network (collectively "the requested lists"). In response, the control element 100 may provide the requested lists to the mobile device 200. The requested lists may be based on device discovery information which may have been previously received via the control point component 103 and/or may have been stored by the core component 101 in the storage component 102. The mobile device 200 may display the requested lists to the user.

The user may utilize the mobile device 200 to request that the control element 100 refresh a list of the known media servers connected to the network and/or the known media rendering devices connected to the network ("the refreshed list"). In response, the control point component 103 of the control element 100 may initiate a device discovery refresh using standard UPnP methods. The control element 100 may provide the refreshed list to the mobile device 200. The mobile device 200 may display the refreshed list to the user. The control element 100 may update the list of known media servers connected to the network and/or the list of known media rendering devices connected to the network that may be located internally to the control element 100.

The user may utilize the mobile device 200 to instruct the control element 100 to browse for content which may be provided by a media server. A browse request may be transmitted from the mobile device 200 to the control element 100. The browse request may include a content location, a search term and/or a filter. The content location may be, for example, a folder name, a directory pathname, a container identification number, a URL and/or other means to specify a location for browsing within a content directory structure and/or organization hierarchy under which a media server may present content for browsing. The filter may identify specific metadata fields to limit browse responses to have only the specific metadata fields. The filter may have a range of multimedia content file indices, such as, for example, 10-20, to limit the browse responses to a subset of the multimedia content files which may normally be returned. Furthermore, the browse request may indicate that the multimedia content files which would normally be returned in the browse results should be added to a new device queue or an existing device queue managed by the control element 100.

In response, the control point component 103 may transmit browsing commands to the media server and/or may receive browse results from the media server. The browse results may be transmitted from the control element 100 to the mobile device 200. If the browse request indicated that the browse results should be added to a new device queue, then the control element 100 may create the new device queue and/or may add the multimedia content files indicated in the browse results to the new device queue. If the browse request indicated that the browse results should be added to an existing device queue, then the control element 100 may add the multimedia content files indicated in the browse results to the existing device queue. The control element 100 may transmit information about the new device queue and/or the modified existing device queue to the mobile device 200.

The browse results may have a list of multimedia content files and/or containers that have the multimedia files which may be available from the media server. The browse results may have metadata about each of the multimedia content files and/or each of the containers. The metadata for the containers may have a title, an identifier for the container, an identifier for a parent of the container and/or a URL referencing the container. The metadata about the multimedia content files may have a file type, a genre, a MIME type, a title, an author, an album name, a content rating, a copyright date, a reference to an associated graphic display icon and/or the like. The file type may be, for example, audio file, video file, image, playlist and/or the like. The browse results may be formatted as plain text, as Extensible Markup Language ("XML"), as a Digital Item Declaration Language ("DIDL")-Lite fragment and/or in another appropriate format. The mobile device 200 may display information from the metadata to the user.

The mobile device 200 may instruct the control element 100 to query one of the media rendering devices 220 for capabilities of the media rendering device. In response, the control point component 103 may use standard UPnP capability exchange to determine the capabilities of the specific media rendering device. Information regarding the capabilities of the specific media rendering device may be transmitted to the mobile device 200. The mobile device 200 may determine whether a specific media rendering device is capable of rendering a multimedia content file based on the capabilities of the media rendering device and/or properties of the multimedia content file. The mobile device 200 may determine the properties of the multimedia content file via browse techniques described previously.

The user may utilize the mobile device 200 to instruct the control element 100 to direct a specific media rendering device to render a specific multimedia content file. In response, the control point component 103 may transmit standard UPnP commands to establish an AV Transport Uniform Resource Identifier ("URI") for the specific media rendering device. The AV Transport URI and/or an error message generated by the specific media rendering device may then be transmitted from the control element 100 to the mobile device 200.

The user may utilize the mobile device 200 to instruct the control element 100 to control a play state of a specific media rendering device. For example, the mobile device 200 may request VCR-like control over the specific media rendering device, such as, for example, play, stop, pause, fast-forward, reverse, position seeking and/or the like. In response, the control point component 103 may transmit standard UPnP commands to achieve a corresponding control result for rendering on the specific media rendering device. As another example, the mobile device 200 may request control over an audio volume setting on the specific media rendering device, such as, for example, changing a volume, setting a mute state and/or the like. The control point component 103 may transmit standard UPnP commands to achieve a corresponding volume control result on the specific media rendering device. Other standard UPnP commands for rendering control may also be exposed by the control element 100 for use by the mobile device 200.

The user may utilize the mobile device 200 to instruct the control element 100 to provide information about a current play state of a specific media rendering device. For example, the mobile device 200 may request information about a multimedia content file which a specific media rendering device may be currently rendering, about a current playback position, a playback time, a playback speed and/or whether the specific media rendering device is currently paused. The mobile device 200 may request, for example, the volume setting of the specific media rendering device, a maximum available volume setting of the specific media rendering device and/or whether the specific media rendering device is currently in the mute state. In response, the control point 103 may transmit standard UPnP commands to the specific media rendering device and/or may transmit information from the response from the specific media rendering device to the mobile device 200. The mobile device 200 may display the information from the response to the user.

The user may utilize the mobile device 200 to instruct the control element 100 to create, edit and/or delete a playlist on a specific media server. An instruction to edit the playlist may have operations to add multimedia content files to the playlist, to remove multimedia content files from the playlist and/or to move multimedia content files within the playlist. In response, the control point component 103 may transmit standard UPnP commands to the specific media server to create, edit and/or delete the playlist on the specific media server. A result of the instruction to create, edit and/or delete the playlist and/or an error message may be collected by the control element 100 and/or may be transmitted to the mobile device 200. The mobile device 200 may display the result of the instruction to create, edit or delete the playlist and/or the error message to the user.

The user may utilize the mobile device 200 to transmit a rename and/or delete instruction to the control element 100 to rename and/or to delete a multimedia content file and/or a file container that contains multimedia content files from a specific media server. In response, the control point 103 may transmit standard UPnP commands to the specific media server to rename and/or to delete the multimedia content file and/or the file container. A result of the rename and/or delete instruction and/or an error message may be collected by the control element 100 and/or may be transmitted to the mobile device 200. The mobile device 200 may display the result of the rename and/or delete instruction.

The mobile device 200 may instruct the control element 100 to provide the mobile device 200 with event messages associated with media servers connected to the network and/or media rendering devices connected to the network. In response, the control point 103 may subscribe to the associated event messages using a standard UPnP AV event message subscription framework. The control element 100 may then collect information regarding the event messages as the information is transmitted from the media servers connected to the network and/or the media rendering devices connected to the network. The control element 100 may transmit the information regarding the event messages to the mobile device 200.

Media server event messages may be, for example, an indication of when a media server becomes available or unavailable in the network, an indication of updated content located on a media server and/or the like. The media server event messages related to the updated content may, for example, indicate that new content is available from the media server, that content has been removed from the media server, that content metadata and/or URLs have changed on a media server, that a directory structure of a media server has changed and/or the like.

Media rendering device event messages may be, for example, an indication of when a media rendering device becomes available or unavailable in the network, an indication of a change in the playback state of the media rendering device and/or the like. The media rendering device event messages related to the playback state may indicate, for example, changes and/or updates to a multimedia content file currently being rendered, the current playback position, the playback time, the playback speed, whether the specific media rendering device is currently paused, the volume setting of the specific media rendering device, whether the specific media rendering device is currently in the mute state and/or the like. The media rendering device event messages may indicate that the media rendering device has reached the end of the current multimedia content file.

The mobile device 200 may instruct the control element 100 to establish one or more defaults and/or preferences which may be stored in the state for the session recorded in the storage component 102 of the control element 100. The user may utilize the mobile device 200 to instruct the control element 100 to establish the defaults and/or the preferences. The defaults and/or the preferences may be used in processing of subsequent commands. For example, the mobile device 200 may instruct the control element 100 to establish a default media server and/or a default media rendering device to be used in the subsequent commands. The mobile device 200 may provide a filter to limit subsequent browse results based on media type, MIME type, genre, content rating and/or the like. The mobile device 200 may establish a preferred resolution for graphic thumbnail icons to be used in a user interface display located on the mobile device 200. Furthermore, the mobile device 200 may query the control element 100 to recover the defaults and/or the preferences previously established by the mobile device 200.

The user may utilize the mobile device 200 to transmit a request to the control element 100 which may control the enhanced device queue functionality of the control element 100. The request may be used, for example, to create, edit and/or manage a device queue, associate a device queue with a specific media rendering device, initiate and/or control rendering of multimedia content from a device queue to an associated media rendering device and/or the like. The request may be received from the mobile device 200 using the associated control interface 202 and/or the associated data connection 201 and/or may be interpreted by the core component 101 of the control element 100. The request may cause the core component 101 to, for example, access a device queue record that may be maintained in the storage component 102, modify the device queue record and/or transmit information about the device queue to the mobile device 200. The request may cause the core component 101 to instruct the control point component 103 to transmit standard UPnP commands to a media rendering device associated with the device queue to initiate and/or control playback of multimedia content files located in the device queue.

The following are typical command exchanges in which the mobile device 200 may access and/or may control the enhanced device queue capabilities of the control element 100. The mobile device 200 may request that the control element 100 provide a list of available device queues and/or provide detailed information about a device queue. In response, the core component 101 may obtain requested information from the device queue record that may be maintained in the storage component 102 and/or may transmit the information to the mobile device 200. The list of available device queues may have device queue names, identification numbers, URLs and/or other unique identifiers which may be used to reference the device queues in subsequent commands. Detailed information about a device queue may have, for example, an ordered list of multimedia content files located in the device queue, a reference to a media rendering device that may be associated with the device queue, the current playback state of the device queue, a reference to a session which may have created the device queue, a reference to the mobile device which may have created and/or may be associated with the device queue, a reference to a user which may have created and/or may be associated with the device queue and/or an indication of whether access to the device queue is locked to a specific session, a specific mobile device and/or a specific user.

The user may utilize the mobile device 200 to request that the control element 100 create a new device queue. The mobile device 200 may transmit a new device queue creation command to the control element 100. For example, the core component 101 may create a new device queue record in the storage element 102 and/or may transmit to the mobile device 200 a device queue name, an identification number, a URL and/or other identifier by which the new device queue may be subsequently referenced. The new device queue may be empty initially and/or the new device queue may have multimedia content files that may be specified by the mobile device 200 by the new device queue creation command. The new device queue may be associated with a default media rendering device, may be associated with a media rendering device that may be specified by the mobile device 200 in the new device queue creation command, or may not be associated with a media rendering device.

The user may utilize the mobile device 200 to request that the control element 100 delete a device queue. In response, the core component 101 may delete the device queue and/or may delete the device queue record from the storage element 102. The user may utilize the mobile device 200 to request that the control element 100 edit a device queue. For example, editing operations may be adding one or more multimedia content files to the device queue, removing one or more multimedia content files from the device queue, moving a location of one or more multimedia content files within the device queue and/or removing all of the multimedia content files from the device queue. The core component 101 may implement appropriate changes to the device queue and/or to the device queue record that may be maintained in the storage element 102.

The user may utilize the mobile device 200 to request that the control element 100 create a new device queue based on a particular browse request, based on specified user preferences and/or based on previous content viewing and/or listening history. The browse request may include a content location, a search term, and/or a filter, as described previously. The user preferences may include a media type, a genre, a style, an album name, a series title, a date range, a set of "seed" terms and/or the like. The seed terms may include a list of one or more multimedia content files, artists, albums, program series titles and/or other means to specify multimedia content which may be similar to and/or may correspond to the specified seed terms.

If the request to create a new device queue indicates a browse request, the control element 100 may transmit a corresponding browse request to an appropriate media server as described previously, may create a new device queue with an associated state stored in the storage element 102, may add browse results to the new device queue and/or may transmit information about the new device queue to the mobile device 200. If the browse request indicates user preferences, the control element may transmit one or more browse requests to one or more available media servers, may arrange, filter and/or limit browse results to correspond to the user preferences, may create a new device queue with an associated state stored in the storage element 102, may add the arranged, filtered and/or limited browse results to the new device queue and/or may transmit information about the new device queue to the mobile device 200. The control element 100 may make use of a "content recommendation engine" in order to select multimedia content to be included in a new device queue based on user preferences. The content recommendation engine is not in the scope of the current invention; however, examples of content recommendation engines are well known in the art.

If the request to create a new device queue specifies creation of a new device queue based on previous content viewing and/or listening history, the core component 101 of the control element 100 may access the storage element 102 to determine specific multimedia content from the viewing and/or listening history of the mobile device 200 and/or the user of the mobile device 200. The multimedia content may have been previously viewed, listened to and/or added to device queues by the mobile device 200 and/or the mobile device user. The control element 100 may create a new device queue with an associated state stored in the storage element 102, may add the multimedia content to the new device queue and/or may transmit information about the new device queue to the mobile device 200.

The user may utilize the mobile device 200 to specify a subset of selected multimedia content files that may be located in a device queue. Subsequent rendering of the device queue may be limited to the subset of the selected multimedia content files. The core component 101 may set a "selected" flag to "yes" for each multimedia content file of the selected subset, and/or may set a "selected" flag to "no" for each multimedia content file not located in the selected subset, for the device queue record that may be maintained in the storage element 102. The mobile device 200 may retrieve values of the "selected" flags associated with the multimedia content files located in the device queue if the mobile device 200 requests detailed information about the device queue.

The user may utilize the mobile device 200 to instruct the control element 100 to initiate and/or to control rendering of a device queue by an associated media rendering device. The associated media rendering device may have been previously associated with the device queue, may be a default media rendering device or may be specified when the mobile device instructs the control element 100 to initiate the rendering of the device queue. The rendering of the device queue may begin with rendering of a first multimedia file located in the device queue or may begin with rendering of a multimedia content file specified by the user and/or the mobile device 200. The rendering of the device queue may render the multimedia content files located in the device queue or may be limited to rendering of a subset of selected multimedia content files. The rendering of the device queue may be in a normal mode, or the rendering of the device queue may be in a "shuffle" mode which may randomize an order in which the multimedia content files are rendered.

Rendering control may have VCR-like controls, such as, for example, play, pause, stop, fast-forward, rewind, seek and/or the like. For example, the rendering control may enable the user to establish which multimedia content file is currently being rendered, establish which multimedia content file will be rendered next, advance forward to the next multimedia content file located in the device queue, advance backward to the previous multimedia content file located in the device queue, advance to a random multimedia content file located in the device queue and/or the like. As a further example, the rendering control may enable the user to establish a time interval at which image objects may be displayed in a "slide show" mode and/or may manually advance forward or advance backward through the image objects in the "slide show" mode. The core component 101 may create, may set and/or may alter the playback state associated with the device queue record that may be maintained in the storage element 102. The core component 101 may instruct the control point component 103 to transmit standard UPnP commands to the media rendering device associated with the device queue to initiate and/or to control the rendering of the device queue.

The user may utilize the mobile device 200 to request that the control element 100 provide information about the playback state of a device queue. In response, the core component 101 may obtain the information about the playback state from the device queue record that may be maintained by the storage element 102. The core component 101 may transmit the information about the playback state to the mobile device 200. The mobile device 200 may display the information about the playback state of the device queue to the user.

The information about the playback state of the device queue may have a current play mode, such as, for example, paused, playing and/or the like; a current ordering mode, such as, for example, the normal mode or the "shuffle" mode; a current mode of file limiting, such as, for example, rendering all of the multimedia content files located in the device queue, rendering only selected multimedia content files and/or the like; a current multimedia content file being rendered; a next multimedia content file to be rendered; an associated media rendering device; and/or the like. The information about the playback state of the device queue may also have information and/or estimates of a current playback position, a current playback time, and/or a play time remaining for a multimedia content file being rendered.

The mobile device 200 may instruct the control element 100 to provide the mobile device 200 with information regarding events that may be related to a device queue that may be maintained by the control element 100. In response, the control element 100 may generate and/or may transmit to the mobile device the information regarding the events to indicate a change in the device queue. For example, the changes in the device queue may be a multimedia content file added to the device queue; a multimedia content file deleted from the device queue; movement of a location of a multimedia content file within the device queue; a change in the current play mode, such as, for example, pausing, playing and/or the like; a change in a current ordering mode, such as, for example, changing to the normal mode or changing to the "shuffle" mode; a change in the current mode of file limiting, such as, for example, rendering the multimedia content files, rendering only selected multimedia content files and/or the like; a change of the multimedia content file being currently rendered; an update on the playback time and/or the playback position; a change of the media rendering device associated with the device queue; and/or the like.

The user may utilize the mobile device 200 to instruct the control element 100 to establish one or more defaults and/or preferences which may be used in processing of subsequent commands that may be related to the enhanced device queue capabilities. For example, the defaults and/or the preferences may establish a default media rendering device for device queue playback; a default device queue; a default ordering mode, such as, for example, the normal mode or the "shuffle" mode; a default mode of file limiting, such as, for example, rendering the multimedia content files, rendering only selected multimedia content files and/or the like; a default time interval at which image objects may be displayed in the "slide show" mode; and/or the filter to limit subsequent browse results based on media type, MIME type, genre, content rating and/or the like. The core component 101 may record the defaults and/or the preferences in a session record that may be maintained by the storage element 102. The defaults and/or the preferences may be used by the core component 101 when processing the subsequent commands associated with the session.

The user may utilize the mobile device 200 to request that the control element 100 lock access to a specific device queue. The control element 100 may grant the request to lock access, may deny the request to lock access and/or may inform the mobile device 200 as to whether the request to lock access is granted or denied. The mobile device 200 may indicate to the user whether the control element 200 granted the request to lock access or denied the request to lock access. If the request to lock access is granted, the core component 101 may update the device queue record that may be maintained by the storage element 102 to indicate that access to the device queue may be locked. The device queue record may indicate that the device queue is locked to the mobile device 200, to an associated session and/or to the user which may have generated the request to lock access. The core component 101 may allow full access to and/or full control of a locked device queue to the mobile device 200, to the associated session and/or to the user which may have generated the request to lock access.

The core component 101 may limit access to and/or control of the locked device queue by other mobile devices, other sessions and/or other users. The other mobile devices, the other sessions and/or the other users may be allowed to view contents of and/or the playback state of the device queue, but may be prohibited from editing, managing, deleting and/or controlling rendering of the locked device queue. The core component 101 may enforce limits on access and/or control of the locked device queue until the core component 101 receives a request to unlock the device queue from the mobile device 200, the associated session and/or the user which may have generated the request to lock access.

An administrative override may also be provided to allow the locked device queue to be unlocked. The mobile device 200 may lock the device queue temporarily during a time when the mobile device 200 may be editing and/or controlling the device queue to prevent conflicting editing commands and/or conflicting control commands from other mobile devices. Alternatively, the mobile device 200 may lock the device queue for an extended amount of time to prevent shared access to the device queue if shared device queue access is not desired.

The control element 100 may maintain rendering of the device queue. The control element 100 may not require ongoing instructions from the mobile device 200 to maintain the rendering of the device queue created by the mobile device 200. The control element 100 may monitor the playback state of the media rendering device associated with the device queue to determine when standard UPnP commands must be sent to the media rendering device to maintain the rendering of the device queue.

The control element 100 may monitor playback by the media rendering device associated with the device queue, may determine when the media rendering device has completed rendering of the multimedia content file and/or may instruct the media rendering device to initiate rendering of the next multimedia content file. For example, determining of when the media rendering device has completed rendering of the multimedia content file may be based on information regarding standard UPnP events transmitted from the media rendering device to the control element 100, a status message received from the media rendering device in response to a request for status made by the control element 100, an amount of elapsed time that may be measured by the control element 100 using an available clock and/or a combination of these methods.

The next multimedia content file to be rendered may be the next multimedia content file in the ordered list of multimedia content files located in the device queue. If the "shuffle" mode is selected, the next multimedia content file to be rendered may be the next multimedia content file in a random reordering of the ordered list of multimedia content files located in the device queue. If a "play selected objects only" mode is selected, the next multimedia content file to be rendered may be the next multimedia content file having the "selected" status in the ordered list of multimedia content files located in the device queue.

The control element 100 may receive information regarding UPnP events from a media server connected to the network, a media rendering device connected to the network and/or other standard UPnP devices connected to the network. The information regarding the UPnP events may be received by the control point component 103, and/or the information about the UPnP events may be transmitted from the control point component 103 to the core component 101 for processing. The core component 101 may transmit the information regarding the UPnP events to a mobile device which may have requested the information regarding the UPnP events. The information regarding the UPnP events may be transmitted from the control element 100 to the mobile device 200 using the associated control interface 201 and/or the associated data connection 202.

The information regarding the UPnP events may be transmitted from the control element 100 to the mobile device 200 without a delay after the information regarding the UPnP events is received by the control element 100. For example, the information regarding the UPnP events may be transmitted from the control element 100 to the mobile device 200 when the control element 100 receives the information regarding the UPnP events. Alternatively, the information regarding the UPnP events may be collected and/or may be stored by the control element 100 in the storage element 102 of the control element 100. Stored information regarding the UPnP events may be transmitted to the mobile device 200 after a delay and/or may be transmitted to the mobile device 200 in response to a request from the mobile device 200.

The control element 100 may transmit messages into the network which may indicate an existence and/or capabilities of the control element 100. The messages may be transmitted when the control element 100 initiates function, may be transmitted on a periodic basis and/or may be transmitted in response to a device discovery request which the control element 100 may receive from another device connected to the network.

The control element 100 may receive a message which may indicate an existence of and/or capabilities of a second control element connected to the network. After receiving the message which may indicate the existence of and/or the capabilities of the second control element connected to the network, the control element 100 component may exchange information with the second control element to determine which available control element may be the master control element.

Selection of the master control element 100 may be made based on a comparison of the capabilities of the available control elements. For example, the master control element may be selected based on a processing speed, an available memory, a connection speed, a version of software and/or firmware utilized by the control element 100 and/or a combination of these factors. The master control element component may be selected based on an ability to provide a maximum number of control interfaces. The master control element may be selected based on an ability to provide one or more connection technologies necessary for support of one or more control interfaces.

Alternatively, the master control element may be selected using a random process. For example, the available control elements may each generate a random number, may exchange the random numbers and/or may assign master control element status to the available control element that generated the random number which was larger.

As a further alternative, the master control element may be selected based on user preference and/or configuration. For example, an owner and/or an administrator of a home network may configure a specific control element to always be selected as the master control element of the home network.

A new control element may connect to the network. The master control element may already be connected to the network. The master control element may continue to act as the master control element. Alternatively, the master control element selection process may be repeated between the new control element, the master control element and/or the available control elements previously connected to the network. A new master control element may be selected to provide control element services in the network. If the new master control element is selected, an old master control element may transfer state information to the new master control element so that the new master control may assume responsibilities previously held by the old master control element. A mobile device which may have been previously served by the old master control element may be notified that the new master control element was established.

As previously set forth, the control element 100 may expose one or more control interfaces by which mobile devices may communicate with and/or may control the control element 100. The control interface 202 and/or the data connection 201 may allow the associated mobile device 200 to transmit requests to the control element 100 and/or to receive corresponding responses from the control element 100. The control interface 202 and/or the data connection 201 may allow the control element 100 to transmit an event message to the mobile device 200. The event message may not require a corresponding request message to be sent from the mobile device 200 to the control element 100. Alternatively, the control interface 202 and/or the data connection 201 may not allow the control element 100 to transmit the event message to the mobile device and/or may require that the mobile device 200 transmit a request to the control element 100 to obtain the event message from the control element 100.

The control interface 202 and/or the data connection 201 may enable exchange of requests, responses and/or event messages between the mobile device 200 and the control element 100 according to two functional categories: standard UPnP functionality and enhanced device queue functionality. Standard UPnP functionality may involve transmittal of requests, responses and/or event messages that may enable the mobile device 200 to control, manage and/or use standard UPnP devices connected to the network indirectly via the control element 100. Thus, the control element 100 may act as a proxy for commands which may provide standard UPnP functions. For example, the control element 100 may act as the proxy for mobile devices which may not have capability to directly connect to the network and/or which may not directly support a UPnP AV Control Point client. Enhanced device queue functionality may involve transmittal of requests, responses and/or event messages that may enable the mobile device 200 to create, manage and/or use a device queue via the control element 100.

The requests, the responses and/or the event messages may be carried in Hypertext Transfer Protocol ("HTTP") requests and/or HTTP responses, may be carried directly as Transmission Control Protocol ("TCP") packet payloads and/or may be carried in another protocol which may allow bidirectional exchange of data between the mobile device 200 and the control element 100 over the data connection 201 associated with the mobile device 200. The requests, the responses, and/or the event messages may be formatted in XML, in Abstract Syntax Notation One ("ASN.1"), as lists of key/value pairs, as plain text and/or in some other suitable format.

Figure 7:
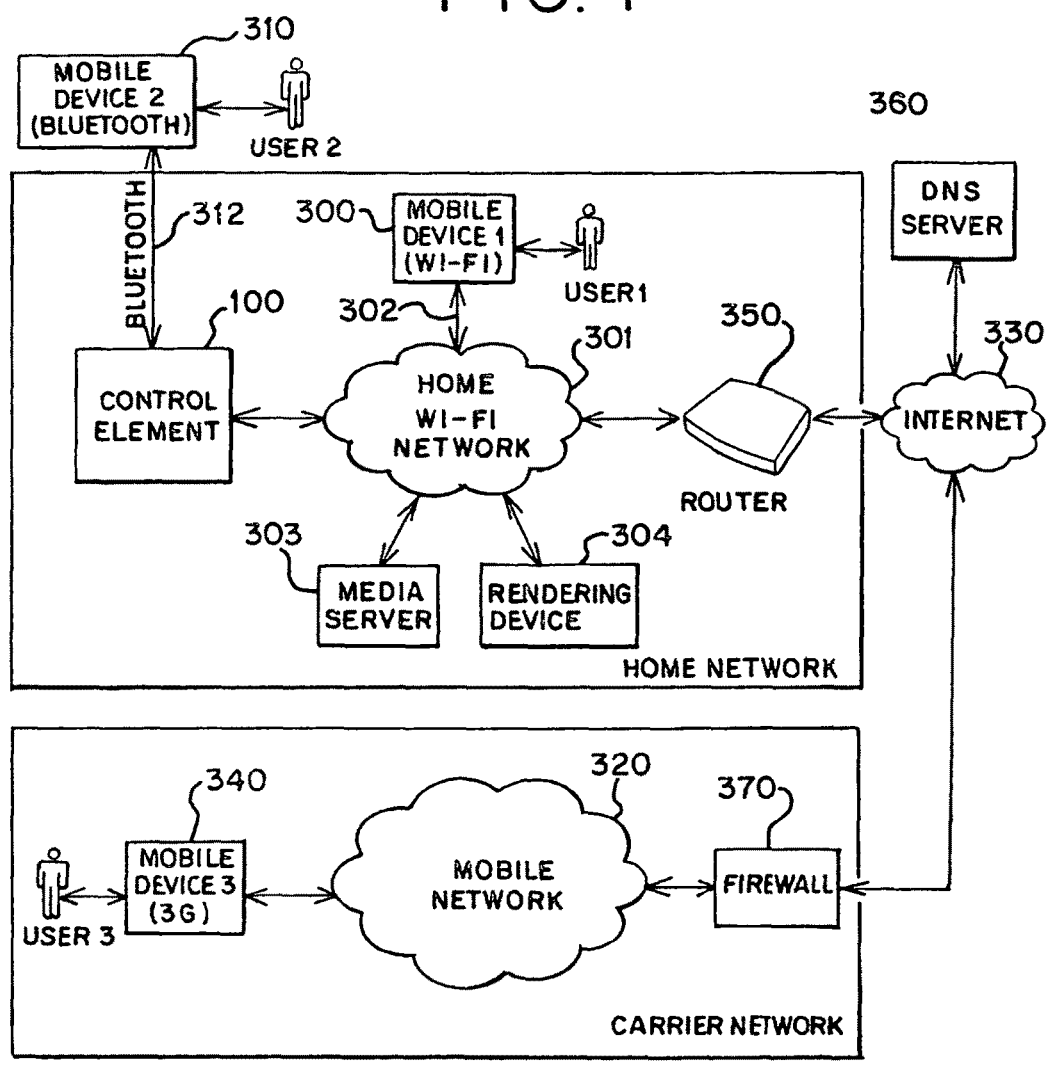
FIG. 7 illustrates various connection technologies employed in an embodiment of the present invention.

Various connection technologies are generally illustrated in FIG. 7. In a preferred embodiment of the present invention, three different connection technologies may be used to provide the connections. A Wi-Fi connection 302 between a mobile device 300 and the control element 100 via a home Wi-Fi network 301 may be utilized if the mobile device 300 has Wi-Fi capability.

A Bluetooth connection 312 between a mobile device 310 and the control element 100 may be utilized if the mobile device 310 and a device (not shown) that may host the control element 100 are both Bluetooth capable. Alternatively, any wireless data connection by which the mobile device 310 may connect directly to the device that may host the control element 100 may be employed.

Connection of a mobile device 340 to the control element may be accomplished using a carrier mobile network 320, the internet 330 and/or the home Wi-Fi network 301 if the mobile device 340 may utilize the carrier mobile network 320. In a preferred embodiment, the network may be a 3 G mobile network. However, any mobile network technology which may provide a wireless data connection to the mobile device may be employed. For example, the carrier mobile network 320 may be a 2.5 G mobile network, a 4G mobile network, a WiMax network and/or the like.

The mobile device 300 having Wi-Fi capability may be directly connected to the home Wi-Fi network 301 via the Wi-Fi connection 302. The control element 100 may expose a control interface to the mobile device 300 having Wi-Fi capability. Any protocol which may be carried on Internet Protocol ("IP") may be used to provide the control interface to the mobile device 300 having Wi-Fi capability. Requests, responses and/or event messages which provide the control interface may be carried in various methods. For example, the requests, the responses and/or the event messages may be formatted as payloads carried directly on Transmission Control Protocol/Internet Protocol ("TCP/IP"). As another example, the requests and/or the responses may be formed as HTTP requests and/or HTTP responses that may have arguments, results and/or other data carried in a body of the HTTP requests and/or the HTTP responses. The event messages may be carried via HTTP requests, and/or the response may be discarded by an original sender of the event message. As yet another example, requests, arguments, parameters, results and/or other related data may be formatted as XML bodies, as ASN.1 messages, as plain text, as lists of key/value pairs, in another format which may be carried as a TCP payload, as a body of an HTTP request and/or HTTP response, and/or as a payload of some other IP-based protocol.

The Wi-Fi connection 302 which may connect the mobile device 300 having Wi-Fi capability to the control element 100 may be a data path via the home Wi-Fi network 301. The Wi-Fi connection 302 which may connect the mobile device 300 having Wi-Fi capability to the control element 100 may enable the control element 100 to transmit event messages directly to the mobile device 300 having Wi-Fi capability. Therefore, the control interface exposed to the mobile device 300 having Wi-Fi capability may have multiple options for delivery of the event messages to the mobile device 300 having Wi-Fi capability. The event messages may be sent from the control element 100 to the mobile device 300 having Wi-Fi capability when the event messages are generated and/or after a processing delay. Alternatively, the event messages may be buffered in and/or accumulated by the control element 100 so that multiple event messages may be combined and/or may be transmitted substantially simultaneously from the control element 100 to the mobile device 300 having Wi-Fi capability. Alternatively, the event messages may be buffered in the control element 100 and/or may be transmitted to the mobile device 300 having Wi-Fi capability in response to a request transmitted from the mobile device 300 having Wi-Fi capability to the control element 100.

Although the mobile device 300 having Wi-Fi capability may have connection capability for communicating directly with a media server 303 connected to the home Wi-Fi network 301 and/or a media rendering device 304 connected to the home Wi-Fi network 301, the mobile device 300 having Wi-Fi capability may not be required to communicate directly with the media server 303 and/or the media rendering device 304. The mobile device 300 having Wi-Fi capability may not be required to communicate directly with the media server 303 and/or the media rendering device 304 because the control element 100 may provide a single point of communication which may be used to control the media server 303 and/or the media rendering device 304. Thus, the mobile device 300 having Wi-Fi capability may not be required to support standard UPnP commands. Further, the mobile device 300 having Wi-Fi capability may not be required to have UPnP Control Point functionality because the UPnP Control Point functionality may be provided by the control element 100 using the control interface.

The mobile device 310 having Bluetooth capability may be directly connected by the Bluetooth connection 312 to the device which may host the control element 100. The control element 100 may expose a control interface to the mobile device 310 having Bluetooth capability. The control interface may utilize an appropriate Bluetooth profile which may be supported by both the mobile device 310 having Bluetooth capability and the device which may host the control element 100. For example, the control interface may be based on a Bluetooth Personal Area Network ("PAN") profile and/or another profile which may allow bidirectional message exchange. Requests, responses and/or events which provide the control interface may be performed and/or transmitted in a manner similar to that of the mobile device 300 having Wi-Fi capability. For example, requests, arguments, parameters, results and/or other related data may be formatted as XML bodies, as ASN.1 messages, as plain text, as lists of key/value pairs, in another format which may be carried as a TCP payload, as a body of an HTTP request and/or HTTP response, and/or as a payload of some other IP-based protocol.

After the Bluetooth data connection 312 is established, the control element 100 may use the Bluetooth data connection 312 to transmit event messages directly to the mobile device 310 having Bluetooth capability. Thus, the control interface exposed to the mobile device 310 having Bluetooth capability may have multiple options for the delivery of the event messages to the mobile device 310 having Bluetooth capability. The event messages may be sent from the control element 100 to the mobile device 310 having Bluetooth capability when the event messages are generated or after a processing delay. Alternatively, the event messages may be buffered in and/or accumulated by the control element 100 so that multiple event messages may be combined and/or may be transmitted substantially simultaneously from the control element 100 to the mobile device 310 having Bluetooth capability. Alternatively, the event messages may be buffered in the control element 100 and/or may be transmitted to the mobile device 310 having Bluetooth capability in response to a request transmitted from the mobile device 310 having Bluetooth capability to the control element 100.

The mobile device 310 having Bluetooth capability may not have Wi-Fi capability, may not be capable of connecting directly to the home network and/or may not have any means of direct communication with the media server 303 connected to the home Wi-Fi network 301, the media rendering device 304 connected to the home Wi-Fi network 301 and/or other UPnP devices (not shown) connected to the home Wi-Fi network 301.

The mobile device 340 may connect to the control element 100 using the carrier mobile network 320. Thus, a data connection which connects the mobile device 340 to the control element 100 may be a data path via the carrier mobile network 320, the Internet 330 and/or the home Wi-Fi network 301. As previously set forth, the carrier mobile network 320 may be a 3G mobile network; however, any mobile network technology which may provide a wireless data connection to the mobile device may be employed. For example, the carrier mobile network 320 may be a 2.5 G mobile network, a 4G mobile network, a WiMax network and/or the like.

Complications may arise with the data path that uses the carrier mobile network 320, the Internet 330 and/or the home Wi-Fi network 301 because the control interface may span three separate networks. For example, the mobile device 340 may have an IP address which is a local LAN address in the carrier mobile network 320. The local LAN address may prevent the control element 100 from transmitting a message to the mobile device 340. However, if the device that may host the control element 100 has a globally routable IP address, the mobile device 340 may transmit the message to the control element 100.

If the control element 100 is hosted on a device which has a local LAN address in the home network, the mobile device 340 may not be able to transmit a message directly to the control element 100. Another device connected to the home Wi-Fi network 301, such as, for example, a router 350, may be assigned a globally routable IP address. The mobile device 340 may be able to transmit the message to the globally routable IP address of the router 350. The router 350 may be configured to forward the message from the mobile device 340 to the device that hosts the control element 100. Forwarding may be accomplished using a port mapping method.

As another example of a complication which may arise because the control interface may span three separate networks, the globally routable IP address assigned to the device that may host the control element 100, to the router 350 and/or to another globally addressable device connected to the home Wi-Fi network 301 may change dynamically over time. For example, the globally routable IP address may be changed periodically by an Internet Service Provider which may provide an Internet connection to the home Wi-Fi network 301. Thus, for the mobile device 340 to transmit a message to the control element 100, the mobile device 340 may be required to determine a current IP address of the device that may host the control element 100, the router 350 and/or the other globally addressable device connected to the home Wi-Fi network 301.

A DNS server 360 may be accessible to and/or addressable by the mobile device 340. The DNS server 360 may support Dynamic DNS update methods. For example, the DNS server 360 may support methods described in IETF RFC 2136 "Dynamic Updates in the Domain Name System" and/or similar methods. The DNS server 360 may be constantly updated with the current IP address of the router 350, the device that may host the control element 100 and/or the other globally addressable device connected to the home Wi-Fi network 301. The current IP address may be updated in the DNS server by the Internet Service Provider, the router 350, the device that may host the control element 100, the other globally addressable device connected to the home Wi-Fi network 301 and/or any device connected to the home network which may be aware of the current IP address.

As yet another example of a complication which may arise because the control interface may span three separate networks, the carrier mobile network 320 may implement a firewall 370 which may prevent a message transmitted from the control element 100 from being received by the mobile device 340. However, the firewall 370 may not block a response to a request transmitted from a mobile device connected to the carrier mobile network 320. Thus, the mobile device 340 may initiate a request, such as, for example, a HTTP request, that may be transmitted to the control element 100 connected to the home Wi-Fi network 301. The control element 100 may initiate a response, such as, for example, a HTTP response, that may be transmitted to the mobile device 340 without being blocked by the firewall 370 of the carrier mobile network 320.

The home Wi-Fi network 301 may have a firewall that may reside on the router 350. The home Wi-Fi network 301 may have a software firewall located on a device connected to the home Wi-Fi network 301. The firewall located on the router 350 and/or the software firewall may be configured to not block the request transmitted from the mobile device 340 and/or from other devices located outside of the home Wi-Fi network 301. A configuration of the router 350 and/or a configuration of the software firewall may open a port on the router 350 and/or on the software firewall wherein incoming messages and/or HTTP requests addressed to the port may not be blocked by the router 350 and/or the software firewall.

To address the previously described complications which may arise because the control interface may span three separate networks, an example of a control interface suitable for use by the mobile device 340 follows. The mobile device 340 may access the DNS server 360 to obtain the globally routable IP address assigned to the control element 100, the router 350 and/or the other globally addressable device connected to the home Wi-Fi network 301. A request that may be transmitted from the mobile device 340 to the control element 100 may be formed as an HTTP request and/or may be transmitted to the globally routable IP address. If the globally routable IP address is assigned to the control element 100, then the request may be directly received by the control element 100. If the globally routable IP address is not assigned to the control element 100, the router 350 and/or the other globally addressable device connected to the home Wi-Fi network 301 may receive the request and/or may be configured to forward the request to the control element 100. The control element 100 may receive and/or may process the request as described previously.

For each request received, the control element 100 may generate a response and/or may transmit the response to the mobile device 340. The response may be formatted as an HTTP response to the received HTTP request. HTTP responses are universally accommodated by firewalls and Network Address Translation functions ("NATs") which may be present in various networks. Therefore, the response may be delivered to the mobile device 340.

The control element 100 may not be able to transmit an event message to the mobile device 340 because the event message may be blocked by the firewall 370 of the carrier mobile network. Thus, the control element 100 may generate event messages and/or may store the event messages in the storage component 102 of the control element 100. The mobile device 340 may transmit a request for event messages to the control element 100. The control element 100 may generate a response that may have the event messages that may have been previously generated and/or stored by the control element 100. The mobile device 340 may transmit requests for event messages in periodic time intervals.

Alternatively, the mobile device 340 may request event messages at times when the event messages may be useful. For example, the mobile device 340 may request event messages during a period of user interactivity when updated information about the media server 303, media rendering device 304 and/or the device queues may be displayed on a user interface of the mobile device 340. Arguments, parameters, results and/or other data related to the requests, the responses and/or the event messages may be formatted as XML bodies, as ASN.1 messages, as plain text, as lists of key/value pairs and/or in some other format which may be carried in the body of HTTP requests and/or HTTP responses.

FIGS. 8A, 8B, 9A, 9B, 10A, 10B, 11A, 11B, 12A and 12B are flowcharts which generally illustrate communication between mobile devices, a control element, a media server and media rendering devices in an embodiment of the present invention. The steps of FIGS. 8A, 9A, 10A, 11A and 12A are represented in FIGS. 8B, 9B, 10B, 11B and 12B in association with the component of the system that performs the step.

More specifically, in FIGS. 8B, 9B, 10B, 11B and 12B, an area directly beneath the control element 100 is used to generally illustrate internal logic of the control element 100 which may indicate tasks that the control element 100 may undertake. In FIGS. 8B, 9B, 10B, 11B and 12B, areas directly beneath the first mobile device 141 and the second mobile device 142 are used to generally illustrate operations that the first mobile device 141 and the second mobile device 142 may perform, respectively. In FIGS. 8B, 9B, 10B, 11B and 12B, areas directly beneath the first media rendering device 121 and the second media rendering device 122 are used to generally illustrate operations that the first media rendering device 121 and the second media rendering device 122 may perform, respectively. In FIGS. 8B, 9B, 10B, 11B and 12B, an area directly beneath the first media server 111 is used to generally illustrate operations that the first media server 111 may perform.

Each of FIGS. 8A, 9A, 10A, 11A and 12A is a continuation of the previous flowchart diagram, and each of FIGS. 8B, 9B, 10B, 11B and 12B is a continuation of the previous flowchart diagram. The state at the end of each flowchart may be carried over to the beginning of the next flowchart. Thus, FIGS. 8A, 9A, 10A, 11A and 12A may be treated as a single, continuous usage flow, and FIGS. 8B, 9B, 10B, 11B and 12B may be treated as a single, continuous usage flow.

Communication between each of the mobile devices 141, 142, 143 and a control interface side of the control element 100 may use an appropriate data connection which may be supported by both the mobile device and the control element 100. Communication between the control element 100, the media servers 111, 112, 113 and/or the media rendering devices 121, 122, 123 may be via a home network. FIGS. 8A, 8B, 9A, 9B, 10A, 10B, 11A, 11B, 12A and 12B generally illustrate that the mobile devices 141, 142, 143 may not be required to directly connect to and/or to directly communicate with the media servers 111, 112, 113 and/or the media rendering devices 121, 122, 123.

FIGS. 8A, 8B, 9A, 9B, 10A, 10B, 11A, 11B, 12A and 12B indicate the state of the device queues 131, 132, 133 which may be maintained by the control element 100. Each of the device queues 131, 132, 133 is depicted as a box which includes a title line indicating the name of the device queue. The title line may also indicate the media rendering device which may be associated with the device queue, such as, for example, "→R2" which indicates association of the second rendering device 122 with the device queue.

For example, "S1" may represent the first media server 111, "R1" may represent the first media rendering device 121, "R2" may represent the second media rendering device 122, "Q1" may represent the first device queue 131 and/or "Q2" may represent the second device queue 132.

The ordered list of multimedia content files located in the device queue is depicted below the title line. Each of the multimedia content files is shown as a circle or a star. Each of the multimedia content files is labeled with a reference number. Thus, the multimedia content file located above the number "1" is the first multimedia content file of the device queue. A playback order of the objects corresponds to an ascending order of the associated reference numbers. A playback state symbol may appear under one of the multimedia content files to indicate that the device queue is currently in an active playback mode. The position of the playback state symbol indicates that the multimedia content file directly above the playback state symbol may be the multimedia content file currently being played. The playback state symbol may appear as a triangle ("▶") to indicate that the media rendering device that may be associated with the device queue may be currently set to render the multimedia content file directly above the playback state symbol, and that the media rendering device may be in a "play" state. The playback state symbol may appear as a pair of vertical lines ("||") to indicate that the media rendering device that may be associated with the device queue may be currently set to render the multimedia content file directly above the play state symbol, and that the media rendering device may be in a "paused" state and/or a "stopped" state. The device queue may be accompanied by a padlock symbol to indicate that the device queue is locked to a specific mobile device, specific user and/or specific session.

Figure 8A:
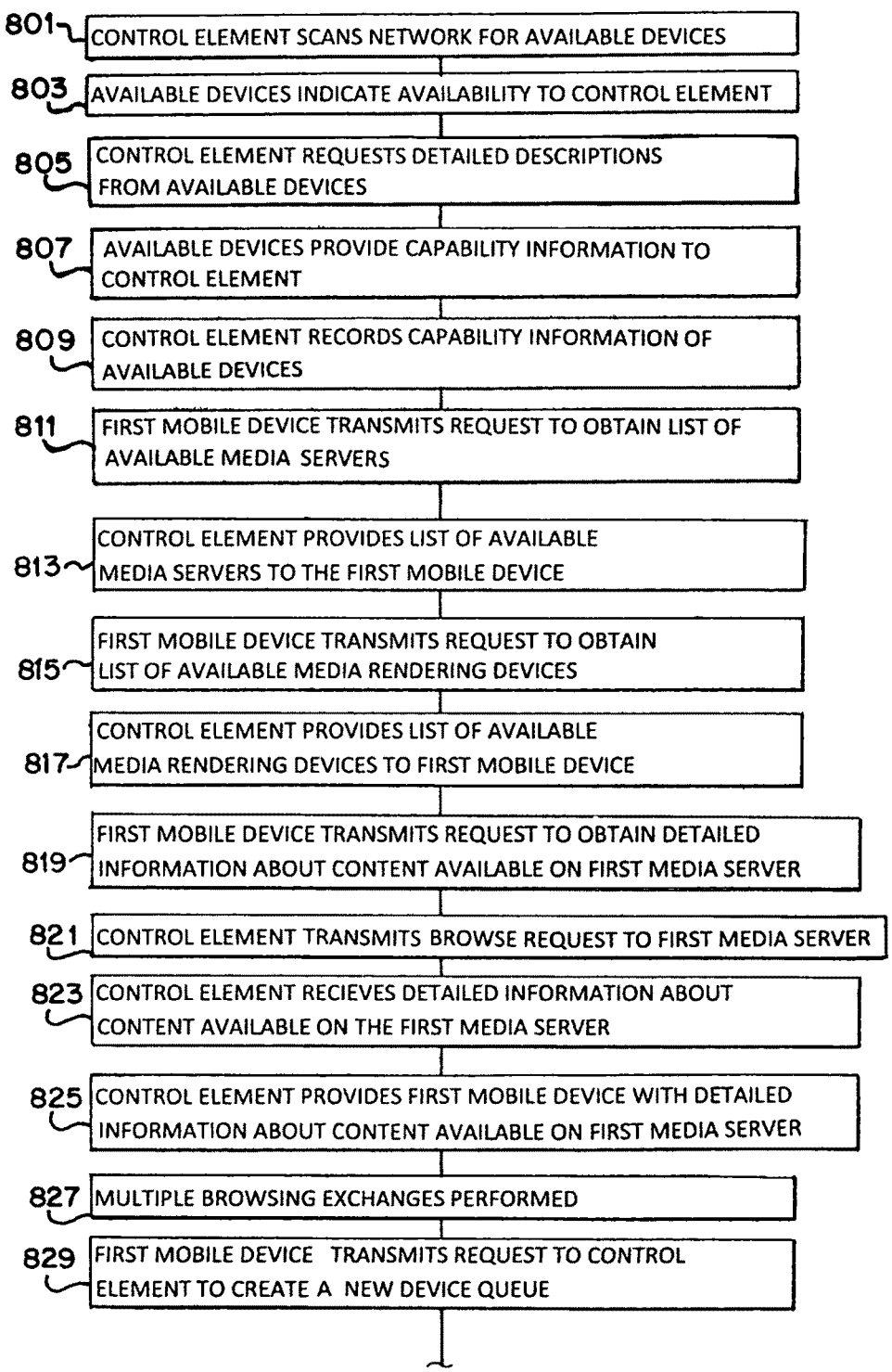
Figure 8A:
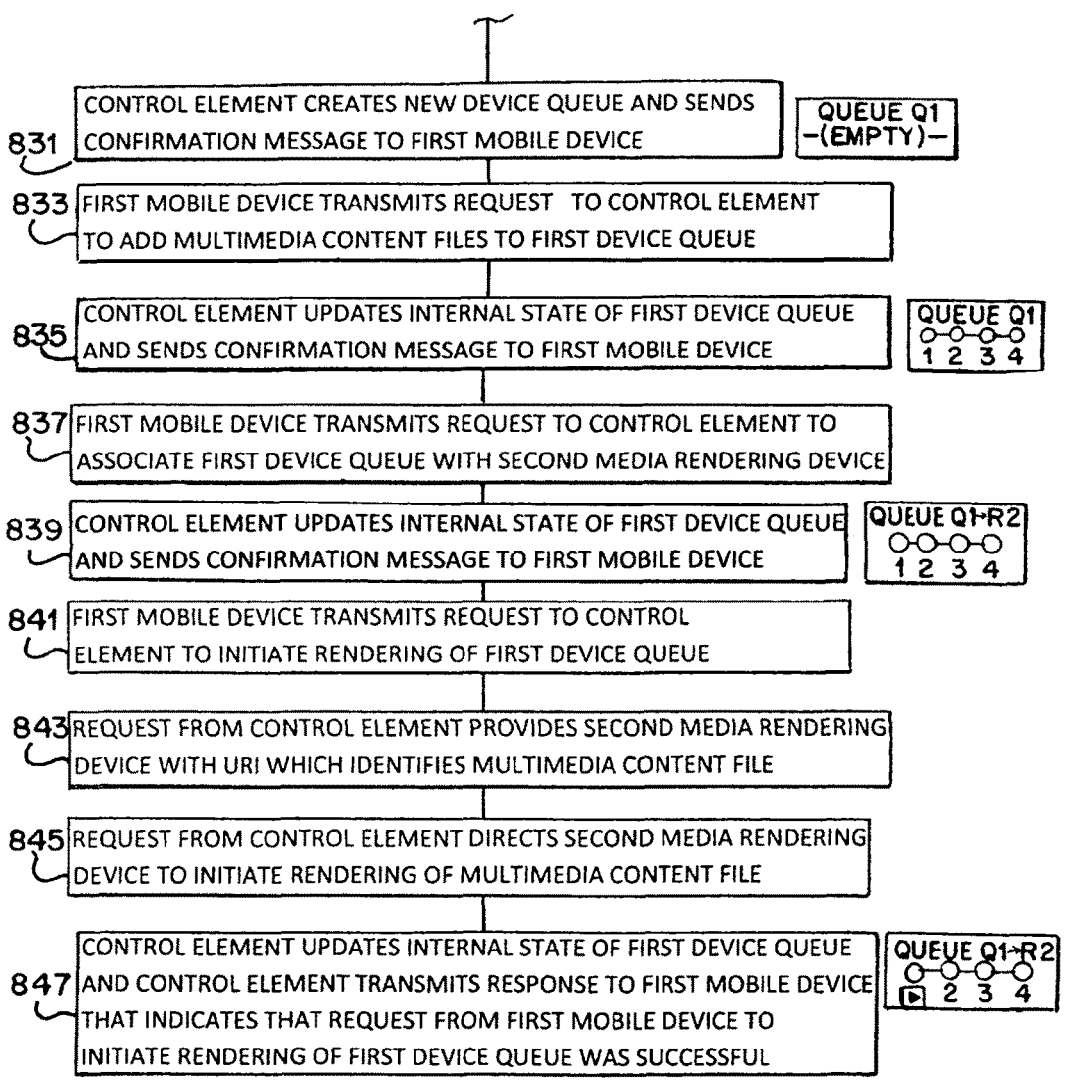

Referring to FIGS. 8A and 8B, the first user 91 may utilize the first mobile device 141 to create a first device queue 131 and/or to initiate playback to the second media rendering device 122. As shown at step 801, the control element 100 may scan the home network for available devices. The control element 100 may scan by transmitting a multicast device scan message into the home network. As shown at step 803, each available UPnP device may respond by transmitting a message, such as, for example, "SSDP:Alive", to the control element 100. The message may indicate the presence of the media servers 111, 112, 113 and/or the media rendering devices 121, 122, 123 available in the home network. In the specific example depicted in FIGS. 8A and 8B, the first media server 111 and/or the second media rendering device 122 may transmit a message to the control element 100 indicating availability. Other media servers and/or other media rendering devices may transmit a message to the control element 100 indicating availability.

As shown at step 805, the control element 100 may request detailed descriptions of the devices and their associated services. As shown at step 807, each device connected to the network may respond by transmitting a message to the control element 100 that may provide capability information, such as, for example, a "SSDP:Device and Service Capabilities" message. The messages that may provide capability information to the control element 100 may provide capability information for each of the media servers 111, 112, 113 and/or the media rendering devices 121, 122, 123 available in the home network.

As shown at step 809, the control element 100 may record the capability information. For example, the storage component 102 of the control element 100 may record the capability information. The capability information may be used internally by the control element 100 and/or may be provided to mobile devices which request information about the available media servers 111, 112, 113 connected to the home network and/or the available media rendering devices 121, 122, 123 connected to the home network. In the specific example depicted in FIGS. 8A and 8B, the control element 100 may receive and/or may store information about the first media server 111 and/or information about the second media rendering device 122. The control element 100 may also receive and/or may store information about other media servers and media rendering devices.

As shown at step 811, the first mobile device 141 may transmit a request to obtain a list of available media servers, such as, for example, "RequestMediaServerList." The request to obtain the list of available media servers may be transmitted to the control element 100. As shown at step 813, the control element 100 may provide the list of available media servers to the first mobile device 141. In the specific example depicted in FIGS. 8A and 8B, the list of available media servers may have the first media server 111. The list of available media servers may also have other available media servers in addition to the first media server 111.

As shown at step 815, the first mobile device 141 may transmit a request to obtain the list of available media rendering devices, such as, for example, "RequestRendererList." The request to obtain the list of available media rendering devices may be transmitted to the control element 100. As shown at step 817, the control element 100 may provide the list of available media rendering devices to the first mobile device 141. In the specific example depicted in FIGS. 8A and 8B, the list of available media rendering devices may have the second media rendering device 122. The list of available media rendering devices may also have other available media rendering devices in addition to the second media rendering device 122.

As shown at step 819, the first mobile device 141 may transmit a request to determine and/or to obtain detailed information about content available from the first media server 111. The request to determine and/or to obtain the detailed information about content available from the first media server 111 may be transmitted to the control element 100. The request to determine and/or to obtain the detailed information may be, for example, "BrowseContent(S1)" wherein S1 may indicate the first media server 111.

The request to determine and/or to obtain the detailed information may have a reference to the first media server 111, a content location, a search term and/or a filter. The content location may be, for example, a folder name, a directory pathname, a container identification number, a URL and/or other means to specify a location for browsing within a content directory structure and/or organization hierarchy under which the first media server 111 may present content for browsing. The filter may identify specific metadata fields to limit browse responses to have only the specific metadata fields. The filter may have a range of multimedia content file indices, such as, for example, 10-20, to limit the browse responses to a subset of the multimedia content files which may normally be returned.

As shown at step 821, the control element 100 may transmit a browse request to the first media server 111. The browse request transmitted from the control element 100 may correspond to the request of the first mobile device 141 to determine and/or to obtain the detailed information about the content available on the first media server 111.

As shown at step 823, the control element 100 may receive the detailed information about content available on the first media server 111, such as, for example, a list of available content and/or associated metadata describing the content. The control element 100 may receive the detailed information about content available on the first media server 111 from the first media server 111. Application of the search term and/or the filter may be accomplished by appropriate construction of the browse request transmitted from the control element 100 to the first media server 111 if a sufficient mechanism for searching and/or filtering is supported by the first media server 111. Alternatively, application of the search term and/or the filter may be performed within the control element 100, such as, for example, by reformatting, altering and/or limiting results provided by the first media server 111 to the control element 100 before the results are transmitted from the control element 100 to the first mobile device 141.

As shown at step 825, the control element 100 may respond to the request of the first mobile device 141 to determine and/or to obtain the detailed information about the content available on the first media server 111 by providing a list of available content and/or the associated metadata describing the content to the first mobile device 141.

As shown at step 827, multiple browsing exchanges may be performed as the first user 91 may navigate available folders, available containers and/or categories under which the first media server 111 may organize and/or may present content for browsing. The first user 91 may select content to be rendered based on one or more lists of available content and/or the associated metadata which may be provided to the first mobile device 141 as a result of the browsing exchanges.

As shown at step 829, the first mobile device 141 may transmit a request to the control element 100 to create a new device queue 131, such as, for example, "CreateQueue." User input on the first mobile device 141 may prompt transmittal of the request to create the new device queue 131. In response, the control element 100 may create the new device queue 131 and/or may return a queue identifier, such as, for example, "Q1", to the first mobile device 141 as shown at step 831. The queue identifier may be used by the first mobile device 141 to reference the first device queue 131 in subsequent commands.

As shown at step 833, the first mobile device 141 may transmit one or more requests to the control element 100 to add multimedia content files to the first device queue 131, such as, for example, "AddToQueue(Q1,ContentList)" wherein Q1 may identify the first device queue 131 and/or ContentList may indicate a list of multimedia content files to be added to the first device queue 131. User input on the first mobile device 141 may prompt transmittal of the request to add the list of multimedia content files to the first device queue 131. The list of multimedia content files to be added to the first device queue 131 may be specified by reference to corresponding multimedia content files on the first media server 111. In response, the control element 100 may update an internal state of the first device queue 131 and/or may indicate to the first mobile device 141 that the multimedia files were added to the first device queue 131 successfully, as shown at step 835. In the specific example depicted in FIGS. 8a and 8B, four multimedia content files were added to the first device queue 131.

As shown at step 837, the first mobile device 141 may transmit a request to the control element 100 to associate the first device queue 131 with the second media rendering device 122. The request to associate the first device queue 131 with the second media rendering device 122 may be, for example, "AssociateRenderer(Q1,R2)" wherein Q1 may indicate the first device queue 131 and/or R2 may indicate the second media rendering device 122. User input on the first mobile device 141 may prompt transmittal of the request to associate the first device queue 131 with the second media rendering device 122. In response, the control element 100 may update the internal state of the first device queue 131 and/or may indicate to the first mobile device 141 that the first device queue 131 was associated with the second media rendering device 122, as shown at step 839.

As shown at step 841, the first mobile device 141 may transmit a request to the control element 100 to initiate rendering of the first device queue 131, such as, for example, "PlayQueue(Q1)" wherein Q1 may indicate the first device queue 131. User input on the first mobile device 141 may prompt transmittal of the request to initiate rendering of the first device queue 131. In response, the control element 100 may direct the second media rendering device 122 to initiate rendering of a first multimedia content file located in the first device queue 131. As shown at step 843, a request from the control element 100 may provide the second media rendering device 122 with a URI which may identify the first multimedia content file located in the first device queue 131. The request that may provide the URI may be, for example, "SetAVTransportURI(X)" wherein X may indicate the URI. As shown at step 845, a request from the control element 100 may direct the second media rendering device 122 to initiate rendering of the first multimedia content file located in the first device queue 131. The request to initiate rendering of the first multimedia content file may be, for example, "Play." Based on a combination of the request that may provide the URI corresponding to the first multimedia content file located in the first device queue 131 and the request to initiate rendering, the second rendering device 122 may contact the first media server 111 to request the first multimedia content file of the first device queue 131. Other command exchanges may be appropriate for initiating rendering of the first multimedia file, depending on specific capabilities of the second media rendering device 122.

The control element 100 may update the internal state of the first device queue 131 to indicate that the first multimedia content file of the first device queue 131 is currently being rendered on the second media rendering device 122. As shown at step 847, the control element 100 may transmit a response to the first mobile device 141 that may indicate that the request from the first mobile device 141 to initiate rendering of the first device queue 131 was successful. As a result of communications and actions set forth in FIGS. 8A and 8B, the second media rendering device 122 may be rendering the first device queue 131.

Figure 9B:
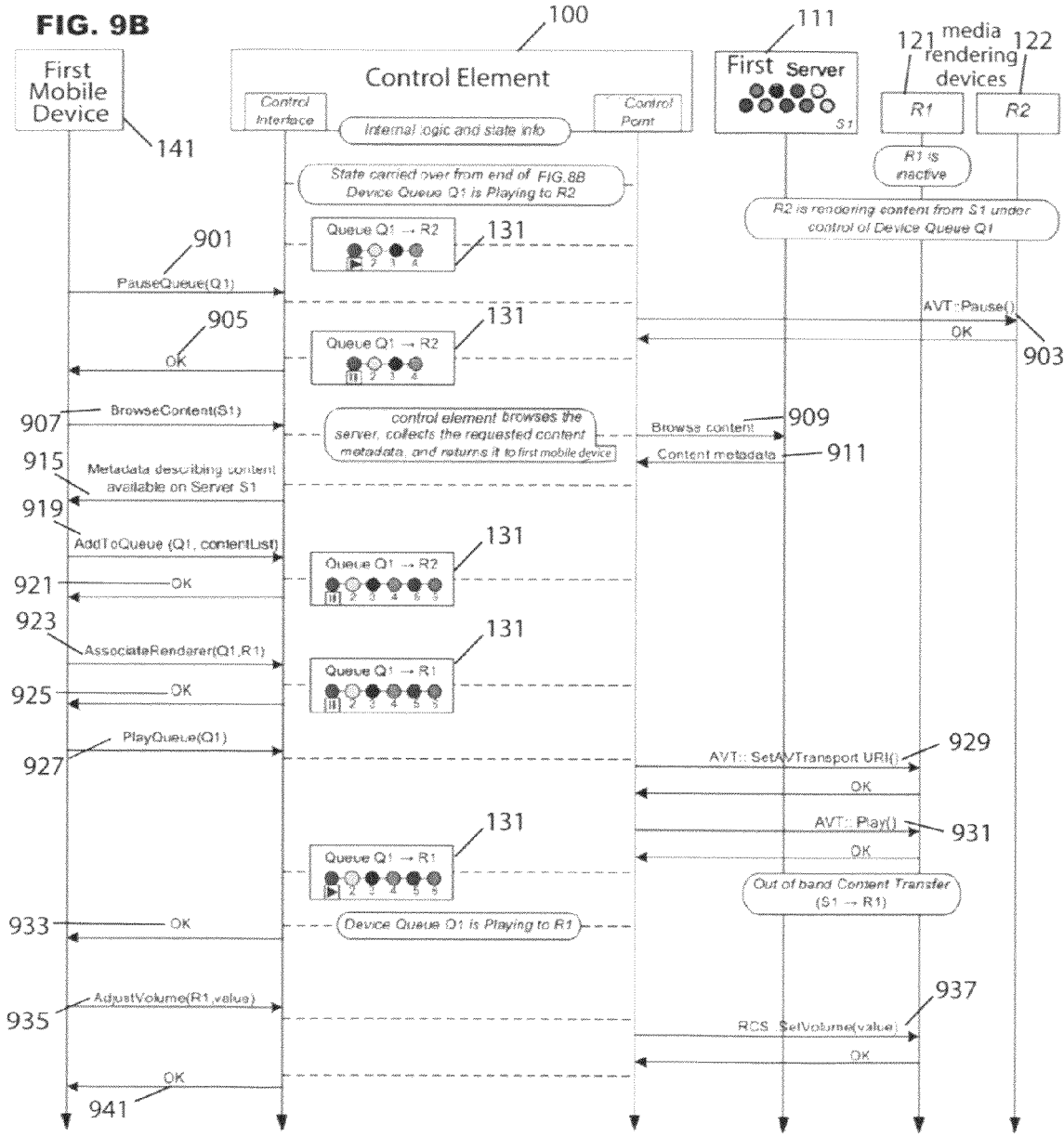

FIGS. 9A and 9B generally illustrate use of the first mobile device 141 by the first user 91 to modify the first device queue 131 and/or to render resulting content on the first media rendering device 121. FIGS. 9A and 9B may be treated as a continuation of FIGS. 8A and 8B, and/or the state at the end of FIGS. 8A and 8B may be carried over to the start of FIGS. 9A and 9B. Thus, the second media rendering device 122 may be rendering the first device queue 131 which may have been generated by the first user 91 using the first mobile device 141.

Referring again to FIGS. 9A and 9B, the first media rendering device 121 may be inactive initially. The capabilities of the first media rendering device may have been discovered and/or may have been recorded by the control element 100. The presence of the first media rendering device 121 may be determined by the first mobile device 141. The presence of the first media rendering device 121 may have been indicated to the first mobile device 141 by the control element 100 in response to a request from the first mobile device 141 to obtain the list of available media rendering devices.

As shown at step 901, the first mobile device 141 may transmit a request to the control element 100 to pause rendering of the first device queue 131, such as, for example, "PauseQueue(Q1)" wherein Q1 may indicate the first device queue 131. User input on the first mobile device 141 may prompt transmittal of the request to pause rendering of the first device queue 131. In response, the control element 100 may communicate with the second media rendering device 122 to pause and/or to stop rendering of the first multimedia content file, as shown at step 903. The control element 100 may update the internal state of the first device queue 131 and/or may indicate to the first mobile device 141 that rendering of the first multimedia content file was paused and/or stopped as shown at step 905.

As shown at step 907, the first mobile device 141 may transmit a request to determine and/or to obtain detailed information about the content available on the first media server 111. The request to determine and/or to obtain detailed information about the content available on the first media server 111 may be, for example, "BrowseContent(S1)" wherein S1 may indicate the first media server 111. The request may be transmitted to the control element 100. As shown at step 909, the control element 100 may transmit a browse request to the first media server 111. The browse request transmitted from the control element 100 may correspond to the request of the first mobile device 141 to determine and/or to obtain the detailed information about the content available on the first media server 111.

As shown at step 911, the control element 100 may receive the detailed information about content available on the first media server 111, such as, for example, a list of available content and/or associated metadata describing the content. The control element 100 may receive the detailed information about content available on the first media server 111 from the first media server 111.

As shown at step 915, the control element 100 may respond to the request of the first mobile device 141 to determine and/or to obtain the detailed information about the content available on the first media server 111 by providing the list of available content and/or the associated metadata describing the content to the first mobile device 141.

As shown at step 919, the first mobile device 141 may transmit one or more requests to add one or more multimedia content files to the first device queue 131. User input on the first mobile device 141 may prompt transmittal of the request to add multimedia content files to the first device queue 131. The request to add the multimedia content files to the first device queue 131 may be transmitted to the control element 100. The request to add multimedia content files to the first device queue 131 may be, for example, "AddToQueue(Q1, ContentList)" wherein Q1 may indicate the first device queue 131 and/or ContentList may indicate a list of one or more multimedia content files to be added to the first device queue 131. The list of multimedia content files to be added to the first device queue 131 may be specified by reference to corresponding multimedia content files on the first media server 111. In response, the control element 100 may update an internal state of the first device queue 131 and/or may indicate to the first mobile device 141 that the multimedia files were added to the first device queue 131 successfully, as shown at step 921. In the specific example depicted in FIGS. 9A and 9B, a fifth multimedia content file and a sixth multimedia content file were added to the four multimedia content files already located in the first device queue 131.

As shown at step 923, the first mobile device 141 may transmit a request to change the media rendering device associated with the first device queue 131 to be the first media rendering device 121. The request to change the media rendering device associated with the first device queue 131 may be, for example, "AssociateRenderer(Q1,R1)" wherein Q1 may indicate the first device queue 131 and/or R1 may indicate the first media rendering device 121. User input on the first mobile device 141 may prompt transmittal of the request to change the media rendering device associated with the first device queue 131. The request to change the media rendering device associated with the first device queue 131 may be transmitted to the control element 100. In response, the control element 100 may update the internal state of the first device queue 131 to reflect association of the first device queue 131 to the first media rendering device 121. As shown at step 925, the control element 100 may indicate to the first mobile device 141 that the first device queue 131 is associated with the first media rendering device 121.

As shown at step 927, the first mobile device 141 may transmit a request to initiate rendering of the modified first device queue 131 by the newly associated first media rendering device 121. The request to initiate rendering of the modified first device queue 131 may be, for example, "PlayQueue (Q1)" wherein Q1 may indicate the first device queue 131. User input on the first mobile device 141 may prompt transmittal of the request to initiate rendering of the modified first device queue 131 by the newly associated first media rendering device 121. The request to initiate the rendering of the modified first device queue 131 may direct continued rendering of the first multimedia content file from a point at which rendering was previously paused, or may direct initiation of rendering from a beginning of the first multimedia content file.

In response, the control element 100 may communicate with the first media rendering device 121 to initiate rendering of the first multimedia content file located in the first device queue 131. As shown at step 929, a request from the control element 100 may provide the first media rendering device 121 with a URI which may identify the first multimedia content file located in the first device queue 131. The request that may provide the URI may be, for example, "SetAVTransportURI (X)" wherein X may indicate the URI. As shown at step 931, a request from the control element 100 may direct the first media rendering device 121 to initiate rendering of the first multimedia content file located in the first device queue 131. The request to initiate rendering of the first multimedia content file may be, for example, "Play." Based on a combination of the request that may provide the URI corresponding to the first multimedia content file located in the first device queue 131 and the request to initiate rendering, the first rendering device 121 may contact the first media server 111 to request the first multimedia content file.

The control element 100 may update the internal state of the first device queue 131 to indicate that the first multimedia content file of the first device queue 131 is currently being rendered on the first media rendering device 121. As shown at step 933, the control element 100 may transmit a response to the first mobile device 141 indicating that the first multimedia content file of the first device queue 131 is currently being rendered on the first media rendering device 121. As a result of communications and actions set forth in FIGS. 9A and 9B, the first media rendering device 121 may be rendering the first device queue 131.

The first user 91 of the first mobile device 141 may request an adjustment of a rendering volume. As shown at step 935, the first mobile device 141 may transmit a volume adjustment request to the control element 100. The volume adjustment request may be, for example, "AdjustVolume(R1,X)" wherein R1 may indicate the first media rendering device 121 and/or X may indicate a desired rendering volume level. As a result, the control element 100 may communicate with the first media rendering device 121 to adjust the rendering volume to the desired rendering volume level as shown at step 937. As shown at step 941, the control element 100 may indicate to the first mobile device 141 that the rendering volume was adjusted to the desired rendering volume level.

Figure 10A:
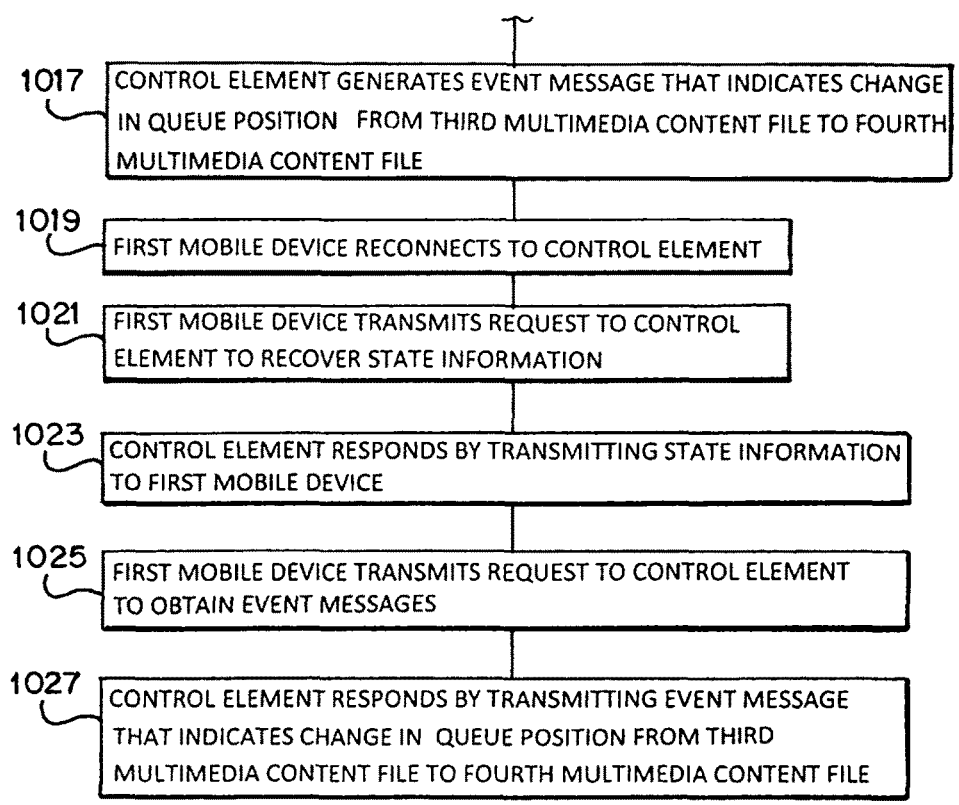

FIGS. 10A and 10B generally illustrate a temporary disconnection of the first mobile device 141 from the control element 100. FIGS. 10A and 10B may be treated as a continuation of FIGS. 9A and 9B, and/or the state at the end of FIGS. 9A and 9B may be carried over to the start of FIGS. 10A and 10B. Thus, the first media rendering device 121 may be rendering the first device queue 131 which may have been modified by the first user 91 using the first mobile device 141.

As shown at step 1001, the first mobile device 141 may transmit a request to the control element 100 to control rendering by advancing to a third multimedia content file located in the first device queue 131. The request to control rendering by advancing to the third multimedia content file may be, for example, "SkipInQueue(Q1,3)" wherein Q1 may indicate the first device queue 131 and/or 3 may indicate the third multimedia content file. User input on the first mobile device 141 may prompt transmittal of the request to control rendering by advancing to a third multimedia content file located in the first device queue 131.

In response, the control element 100 may communicate with the first media rendering device 121 to initiate rendering of the third multimedia content file located in the first device queue 131. As shown at step 1003, a request from the control element 100 may provide the first media rendering device 121 with a URI which may identify the third multimedia content file located in the first device queue 131. The request that may provide the URI may be, for example, "SetAVTransportURI (X)" wherein X may indicate the URI. As shown at step 1005, a request from the control element 100 may direct the first media rendering device 121 to initiate rendering of the third multimedia content file located in the first device queue 131. The request to initiate rendering of the third multimedia content file may be, for example, "Play." Based on a combination of the request that may provide the URI corresponding to the third multimedia content file located in the first device queue 131 and the request to initiate rendering, the first rendering device 121 may contact the first media server 111 to request the third multimedia content file of the first device queue 131.

The control element 100 may update the internal state of the first device queue 131 to indicate that the third multimedia content file located in the first device queue 131 is currently being rendered on the first media rendering device 121. As shown at step 1007, the control element 100 may return a response to the first mobile device 141 that may indicate that the third multimedia content file located in the first device queue 131 is currently being rendered on the first media rendering device 121.

As shown at step 1009, the first mobile device 141 may become disconnected from the control element 100. For example, the first mobile device 141 may be powered "off", may lack sufficient battery power to maintain connection, may be moved to a location that may be outside of a range of a wireless data connection by which the first mobile device 141 may communicate with the control element 100 and/or any connection interruption which may prevent communication between the first mobile device 141 and the control element 100.

As shown at step 1010, rendering by the first media rendering device 121 may reach an end of the third multimedia content file located in the first device queue 131. As shown at step 1011, the first media rendering device 121 may transmit an event message to the control element 100 to indicate that rendering by the first media rendering device 121 may have reached the end of the third multimedia content file located in the first device queue 131. The event message may be, for example, "TransportState=NO_MEDIA_PRESENT". The control element 100 may have previously initiated a subscription to the first media rendering device 121 to receive event messages from the first media rendering device 121.

In response to the event message, the control element 100 may instruct the first media rendering device 121 to initiate rendering of a fourth multimedia content file located in the first device queue 131. As shown at step 1013, a request from the control element 100 may provide the first media rendering device 121 with a URI which may identify the fourth multimedia content file. The request that may provide the URI may be, for example, "SetAVTransportURI(X)" wherein X may indicate the URI. As shown at step 1015, a request from the control element 100 may direct the first media rendering device 121 to initiate rendering of the fourth multimedia content file located in the first device queue 131. The request to initiate rendering of the fourth multimedia content file may be, for example, "Play." Based on a combination of the request that may provide the URI corresponding to the fourth multimedia content file located in the first device queue 131 and the request to initiate rendering, the first rendering device 121 may contact the first media server 111 to request the fourth multimedia content file of the first device queue 131. The control element 100 may update the internal state of the first device queue 131 to indicate that the fourth multimedia content file located in the first device queue 131 is currently being rendered by the first media rendering device 121.

As shown at step 1017, the control element 100 may generate and/or store an event message, such as, for example, "Event-1". The event message may be addressed to the first mobile device 141. The event message may indicate the change in a queue position from the third multimedia content file to the fourth multimedia content file located in the first device queue 131. The event message may be stored by the control element 100 so that the event message may be transmitted to the first mobile device 141 after a request from the first mobile device 141 for event messages. Alternatively, the event message may be transmitted directly to the first mobile device 141 when the event message is generated and/or after a delay.

As shown at step 1019, the first mobile device 141 may reconnect to the control element 100. For example, the first mobile device 141 may be powered "on", may gain sufficient battery power to establish connection and/or may be moved to a location that may be inside of the range of the wireless data connection by which the first mobile device 141 may communicate with the control element 100.

As shown at step 1021, the first mobile device 141 may transmit a request to the control element 100 to recover state information, such as, for example, "GetStateInfo(X)" wherein X may indicate a session. As shown at step 1023, the control element 100 may respond by transmitting the state information to the first mobile device 141. The state information may have information associated with the first user 91, the first mobile device 141 and/or the session specified by the request to recover state information. The state information may have a list of device queues, a list of previously set defaults and/or preferences, an indication of events that may be pending and/or may be awaiting retrieval, and/or the like.

As shown at step 1025, the first mobile device 141 may transmit a request to the control element 100 to obtain event messages which may have been generated by the control element 100 and/or may not have been transmitted to the first mobile device 141. The request to obtain event messages may be, for example, "GetEventInfo(X)" wherein X may indicate the session. The event messages may be associated with the first user 91, the first mobile device 141 and/or with the session specified by the request to obtain event messages. The first mobile device 141 may have previously initiated a subscription to the control element 100 to receive event messages from the control element 100 which may be related to the first media rendering device 121.

As shown at step 1027, the control element 100 may respond by transmitting the event messages, such as, for example, "Event-1", to the first mobile device 141. Therefore, the first mobile device 141 may receive an indication that the rendering of the first device queue 131 has advanced from the third multimedia content file to the fourth multimedia content file.

Figure 11A:
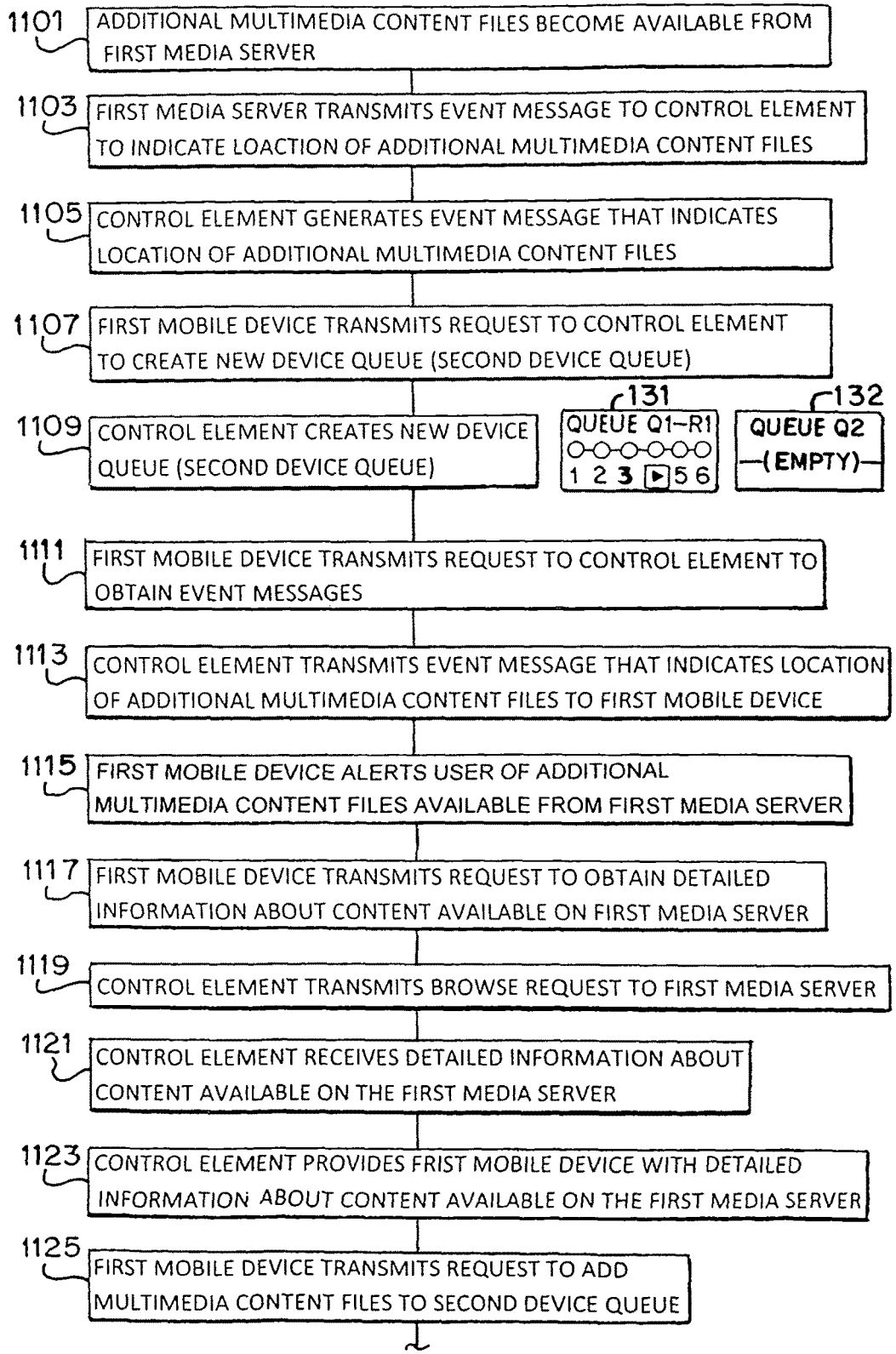

FIGS. 11A and 11B generally illustrate the first user 91 utilizing the first mobile device 141 to create and/or use the second device queue 132. FIGS. 11A and 11B may be treated as a continuation of FIGS. 10A and 10B, and/or the state at the end of FIGS. 10A and 10B may be carried over to the start of FIGS. 11A and 11B. Thus, the first media rendering device 121 may be rendering the first device queue 131 which may have been created and/or may have been modified by the first user 91 using the first mobile device 141.

As shown at step 1101, additional multimedia content files may become available from the first media server 111. The additional multimedia content files are represented by star symbols and pre-existing multimedia content files are represented by circle symbols. As shown at step 1103, the first media server 111 may transmit an event message to the control element 100 to indicate the presence of the additional multimedia content files and/or a location of the additional multimedia content files in a content hierarchy of the first media server 111. As shown at step 1105, the control element 100 may generate and/or may store an event message that may indicate the presence of and/or the location of the additional multimedia content files. The event message that may indicate the presence of and/or the location of the additional multimedia content files may be, for example, "Event-2", and/or may be addressed to the first mobile device 141.

The control element 100 may have previously initiated a subscription to the first media server 111 to receive event messages from the first media server 111. The first mobile device 141 may have previously initiated a subscription to the control element 100 to receive event messages from the control element 100 which are related to the first media server 111. The subscription of the control element 100 to the first media server 111 and/or the subscription of the first mobile device 141 to the control element 100 may cause the first mobile device 141 to receive the event message that may indicate the presence of and/or the location of the additional multimedia content files.

As shown at step 1107, the first mobile device 141 may transmit a request to the control element 100 to create the new device queue 132, such as, for example, "CreateQueue." User input on the first mobile device 141 may prompt transmittal of the request to create the new device queue 132. In response, the control element 100 may create the new device queue 132 and/or may return a queue identifier, such as, for example, "Q2", to the first mobile device 141, as shown at step 1109. The queue identifier may be used by the first mobile device 141 to reference the second device queue 132 in subsequent commands.

As shown at step 1111, the first mobile device 141 may transmit a request to the control element 100 to obtain event messages which may have been generated by the control element 100 and/or may not have been transmitted to the first mobile device 141. The request to obtain event messages may be, for example, "GetEventInfo(X)" wherein X may indicate the session. The first mobile device 141 may have previously initiated a subscription to the control element 100 to receive event messages from the control element 100 which may be related to the first media server 111.

As shown at step 1113, the control element 100 may respond by transmitting event messages, such as, for example, "Event-2", to the first mobile device 141. Therefore, the first mobile device 141 may receive an indication of the presence of and/or the location of the additional multimedia content files available from the first media server 111. The first mobile device 141 may alert the first user 91 to the presence of the additional multimedia content files available from the first media server 111 as shown at step 1115.

As shown at step 1117, the first mobile device 141 may transmit a request to determine and/or to obtain detailed information about the content available on the first media server 111. The request to determine and/or to obtain detailed information about the content available on the first media server 111 may be, for example, "BrowseContent(S1)" wherein S1 may indicate the first media server 111. The request may be transmitted to the control element 100. As shown at step 1119, the control element 100 may transmit a browse request to the first media server 111. The browse request transmitted from the control element 100 may correspond to the request of the first mobile device 141 to determine and/or to obtain the detailed information about the content available on the first media server 111.

As shown at step 1121, the control element 100 may receive the detailed information about content available on the first media server 111, such as, for example, a list of available content and/or associated metadata describing the content. The list of available content may include the additional multimedia content files. The control element 100 may receive the detailed information about content available on the first media server 111 from the first media server 111.

As shown at step 1123, the control element 100 may respond to the request of the first mobile device 141 to determine and/or to obtain the detailed information about the content available on the first media server 111 by providing the list of available content and/or the associated metadata describing the content to the first mobile device 141. The list of available content may include the additional multimedia content files.

As shown at step 1125, the first mobile device 141 may transmit one or more requests to add one or more multimedia content files to the second device queue 132. The request to add multimedia content files to the second device queue 132 may be transmitted to the control element 100. The request to add multimedia content files to the second device queue 132 may be, for example, "AddToQueue(Q2,ContentList)" wherein Q2 may indicate the second device queue 132 and/or ContentList may indicate a list of the multimedia content files to be added to the second device queue 132. The multimedia content files may be specified by reference to corresponding multimedia content files on the first media server 111. User input on the first mobile device 141 may prompt transmittal of the request to add multimedia content files to the second device queue 132.

In response, the control element 100 may update an internal state of the second device queue 132 and/or may indicate to the first mobile device 141 that the multimedia files were added to the second device queue 132 successfully, as shown at step 1127. In the specific example depicted in FIGS. 11A and 11B, four multimedia content files were added to the second device queue 132; a first multimedia content file, a third multimedia content file and/or a fourth multimedia content file may be additional multimedia content files that may be newly available from the first media server 111; and/or a second multimedia content file may be a pre-existing content file that may have already been available from the first media server 111. Therefore, a combination of pre-existing multimedia content files and newly available content files from the first media server 111 may be added to the second device queue 132.

As shown at step 1129, the first mobile device 141 may transmit a request to the control element 100 to associate the second device queue 132 with the second media rendering device 122, such as, for example, "AssociateRenderer(Q2, R2)" wherein Q2 may indicate the second device queue 132 and/or R2 may indicate the second media rendering device 122. User input on the first mobile device 141 may prompt transmittal of the request to associate the second device queue 132 with the second media rendering device 122. In response, the control element 100 may update the internal state of the second device queue 132 and/or may indicate to the first mobile device 141 that the second device queue 132 was associated with the second media rendering device 122, as shown at step 1131.

As shown at step 1132, the first mobile device 141 may transmit a request to the control element 100 to initiate rendering of the second device queue 132, such as, for example, "PlayQueue(Q2)" wherein Q2 may indicate the second device queue 132. User input on the first mobile device 141 may prompt transmittal of the request to initiate rendering of the second device queue 132. In response, the control element 100 may direct the second media rendering device 122 to initiate rendering of the first multimedia content file from the second device queue 132. As shown at step 1133, a request from the control element 100 may provide the second media rendering device 122 with a URI which may identify the first multimedia content file located in the second device queue 132. The request that may provide the URI may be, for example, "SetAVTransportURI(X)" wherein X may indicate the URI. As shown at step 1135, a request from the control element 100 may direct the second media rendering device 122 to initiate rendering of the first multimedia content file located in the second device queue 132. The request to initiate rendering of the first multimedia content file may be, for example, "Play." Based on a combination of the request that may provide the URI corresponding to the first multimedia content file located in the second device queue 132 and the request to initiate rendering, the second rendering device 122 may contact the first media server 111 to request the first multimedia content file of the second device queue 132.

The control element 100 may update the internal state of the second device queue 132 to indicate that the first multimedia content file of the second device queue 132 is currently being rendered on the second media rendering device 122. As shown at step 1137, the control element 100 may transmit a response to the first mobile device 141 that may indicate that the request from the first mobile device 141 to initiate rendering of the second device queue 132 was successful. As a result of communications and actions set forth in FIGS. 11A and 11B, the second media rendering device 122 may be rendering the second device queue 132.

FIGS. 12A and 12B generally illustrate the second user 92 utilizing the second mobile device 142 to control the first device queue 131. FIGS. 12A and 12B may be treated as a continuation of FIGS. 11A and 12A, and/or the state at the end of FIGS. 11A and 11B may be carried over to the start of FIGS. 12A and 12B. Thus, the first media rendering device 121 may be rendering the first device queue 131 which may have been created and/or may have been modified by the first user 91 using the first mobile device 141. The second media rendering device 122 may be rendering the second device queue 132 which may have been created by the first user 91 using the first mobile device 141.

The second mobile device 142 may be connected to the control element 100 using an appropriate data connection and/or an appropriate control interface. The control interface that connects the second mobile device 142 to the control element 100 may be the same as a control interface that connects the first mobile device 141 to the control element 100. Alternatively, the control interface that connects the second mobile device 142 to the control element 100 may be different than the control interface that connects the first mobile device 141 to the control element 100. Control interfaces and/or data connections by which mobile devices connect to the control element 100 may vary based on connection capabilities of the mobile devices and/or connection capabilities of the control element 100.

As shown at step 1201, the second mobile device 142 may transmit a request to the control element 100 to obtain a list of available device queues. The request to obtain the list of the available device queues may be, for example, "GetQueues". In response, the control element 100 may return the list of the available device queues, as shown at step 1203. In the specific example depicted in FIGS. 12A and 12B, the list of the available device queues may have the first device queue 131 and/or the second device queue 132.

As shown at step 1205, the second mobile device 142 may transmit a request to obtain detailed information about a state of the first device queue 131. The request to obtain the detailed information about the state of the first device queue 131 may be, for example, "GetQueueInfo(Q1)" wherein Q1 may indicate the first device queue 131. In response, the control element 100 may return the detailed information about the state of the first device queue 131, as shown at step 1207.

As shown at step 1209, the second mobile device 142 may transmit a request for the control element 100 to lock access to the first device queue 131. The request to lock access to the first device queue 131 may be, for example, "LockQueue(Q1)" wherein Q1 may indicate the first device queue 131. User input on the second mobile device 142 may prompt transmittal of the request to lock access to the first device queue 131. A lock of access to the first device queue 131 may be associated with the second mobile device 142, the second user 92 and/or with a specific session that may be specified by the request to lock access to the first device queue 131. In the specific example depicted in FIGS. 12A and 12B, the lock of access to the first device queue 131 may be associated with the second mobile device 142.

The control element 100 may update the internal state of the first device queue 131 to indicate the lock of access to the first device queue 131 that may be associated with the second mobile device 142. As shown at step 1213, the control element 100 may indicate to the second mobile device 142 that the request to lock access to the first device queue 131 to the second mobile device 142 was granted. The control element 100 may also transmit a key to the second mobile device 142. The second mobile device 142 may use the key to request removal of the lock of access to the first device queue 131 that may be associated with the second mobile device 142.

As shown at step 1215, the first mobile device 141 may transmit a request to the control element 100 to remove the fifth multimedia content file from the first device queue 131. For example, the request may be "RemoveFromQueue(Q1, 5)" wherein Q1 may indicate the first device queue 131 and/or the number 5 may indicate the fifth multimedia content file. User input on the first mobile device 141 may prompt transmittal of the request to remove the fifth multimedia content file from the first device queue 131. As shown at step 1217, the control element 100 may deny the request to remove the fifth multimedia content file from the first device queue 131. The control element 100 may transmit a response to the first mobile device 141 that may indicate denial of the request. The message may indicate a reason for denial of the request, such as, for example, the lock of access to the first device queue 131 that may be associated with the second mobile device 142. The control element 100 may indicate additional information in the response. For example, the response may indicate that the second mobile device 142 and/or the second user 92 requested the lock of access to the first device queue 131 that may be associated with the second mobile device 142.

As shown at step 1219, the second mobile device 141 may transmit a request to the control element 100 to remove the fifth multimedia content file and/or the sixth multimedia content file from the first device queue 131. For example, the request may be "RemoveFromQueue(Q1, [5,6])" wherein Q1 may indicate the first device queue 131; 5 may indicate the fifth multimedia content file; and/or 6 may indicate the sixth multimedia content file. User input on the second mobile device 142 may prompt transmittal of the request to remove the fifth multimedia content file and/or the sixth multimedia content file from the first device queue 131. In response, the control element 100 may remove the fifth multimedia content file and/or the sixth multimedia content file from the first device queue 131, and/or the control element 100 may indicate to the second mobile device 142 that the fifth multimedia content file and/or the sixth multimedia content file were removed from the first device queue 131 as shown at step 1221. The control element 100 may update the internal state of the first device queue 131 accordingly.

As shown at step 1223, the second mobile device 142 may transmit a request to the control element 100 to control rendering by the first media rendering device 121 by advancing to the first multimedia content file located in the first device queue 131. The request to control rendering by the first media rendering device 121 by advancing to the first multimedia content file may be, for example, "SkipInQueue(Q1,1)" wherein Q1 may indicate the first device queue 131 and/or the number 1 may indicate the first multimedia content file. User input on the second mobile device 142 may prompt transmittal of the request to control rendering by the first media rendering device 121 by advancing to the first multimedia content file located in the first device queue 131.

As a result, the control element 100 may communicate with the first media rendering device 121 to initiate rendering of the first multimedia content file located in the first device queue 131. As shown at step 1225, a request from the control element 100 may provide the first media rendering device 121 with a URI which may identify the first multimedia content file located in the first device queue 131. The request that may provide the URI may be, for example, "SetAVTransportURI (X)" wherein X may indicate the URI. As shown at step 1227, a request from the control element 100 may direct the first media rendering device 121 to initiate rendering of the first multimedia content file located in the first device queue 131. The request to initiate rendering of the first multimedia content file may be, for example, "Play." Based on a combination of the request that may provide the URI corresponding to the first multimedia content file located in the first device queue 131 and the request to initiate rendering, the first rendering device 121 may contact the first media server 111 to request the first multimedia content file of the first device queue 131.

The control element 100 may update the internal state of the first device queue 131 to indicate that the first multimedia content file located in the first device queue 131 is currently being rendered on the first media rendering device 121. As shown at step 1229, the control element 100 may return a response to the second mobile device 142 that may indicate that the first multimedia content file located in the first device queue 131 is currently being rendered on the first media rendering device 121.

As shown at step 1231, the second mobile device 142 may transmit a request to the control element 100 to remove the lock of access to the first device queue 131 that may be associated with the second mobile device 142. User input on the second mobile device 142 may prompt transmittal of the request to remove the lock of access. The request to remove the lock of access may be, for example, "UnlockQueue(Q1)" wherein Q1 may indicate the first device queue 131. If the key was provided by the control element 100 to the second mobile device 142, the second mobile device 142 may provide the key in the request to remove the lock of access.

Alternatively, the control element 100 may grant the request to remove the lock of access based on verification that the request to remove the lock of access was transmitted from the mobile device and/or the user that requested the lock of access to the first device queue 131. In the specific example depicted in FIGS. 12A and 12B, the control element 100 may grant the request to remove the lock of access based on verification that the request to remove the lock of access was transmitted from the second mobile device 142 and/or the second user 92.

The control element 100 may remove the lock of access to the first device queue 131 that may be associated with the second mobile device 142, as shown at step 1233. The control element 100 may update the internal state of the first device queue 131 accordingly. As shown at step 1235, the control element 100 may indicate to the second mobile device 142 that the lock of access to the first device queue 131 that may be associated with the second mobile device 142 was removed. As a result of communications and actions set forth in FIGS. 12A and 12B, the first media rendering device 121 may be rendering the first device queue 131 and/or the second media rendering device 122 may be rendering the second device queue 132.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. A method for controlling media rendering in a local area network wherein a first control element, a first media rendering device and a first media server are located in the local area network and further wherein a first mobile device is connected to the first control element wherein the first mobile device and the first media rendering device are different devices and further wherein the first control element is resident in a single device which is a different device than the first mobile device and the first media rendering device wherein a first multimedia file is available from the first media server, the method comprising the steps of:

transmitting a first message wherein the first message is transmitted from the first mobile device to the first control element;

transmitting a second message wherein the second message is transmitted from the first control element to the first mobile device and further wherein the second message corresponds to the first message wherein the second message has the metadata associated with the first multimedia file;

accepting user input on the first mobile device requesting that the first media rendering device provides playback of a first plurality of multimedia files wherein the first plurality of multimedia files includes the first multimedia file;

transmitting a third message which requests that the first media rendering device provides the playback of the first plurality of multimedia files wherein the third message is transmitted from the first mobile device to the first control element;

creating a first device queue which lists the first plurality of multimedia files in a first order which begins with the first multimedia file wherein the first control element creates the first device queue in response to the third message;

storing information about the first device queue on the first control element wherein the information identifies the first plurality of multimedia files, an association of the first media rendering device with the first device queue, and a playback position in the first plurality of multimedia files wherein the first control element stores the information about the first device queue after creating the first device queue;

transmitting a fourth message wherein the fourth message is transmitted from the first control element to the first media rendering device using the local area network; and initiating the playback of the first plurality of multimedia files listed by the first device queue wherein the first media rendering device initiates the playback of the first plurality of multimedia files listed by the first device queue by initiating playback of the first multimedia file and further wherein receipt of the fourth message by the first media rendering device directs the first media rendering device to render the first multimedia file.

2. The method of claim 1 wherein the first mobile device has a web browser and further wherein the first message and the third message originate from the web browser.

3. The method of claim 1 wherein the first message and the third message are Hypertext Transfer Protocol requests.

4. The method of claim 1 wherein the first message and the third message are formatted using Extensible Markup Language.

5. The method of claim 1 wherein the first mobile device has a Flash player and further wherein the first message and the third message originate from the Flash player.

6. The method of claim 1 further comprising the step of:
controlling rendering of the first multimedia file on the first media rendering device wherein the first mobile device controls the rendering of the first multimedia file on the first media rendering device using rendering instructions transmitted from the first mobile device to the first control element.

7. The method of claim 1 further comprising the steps of:
transmitting a browse request from the first mobile device to the first control element in response to user input on the first mobile device wherein the browse request specifies a parameter; and
creating the first device queue so that at least one of the first plurality of multimedia files is a browse result multimedia file which has metadata corresponding to the parameter wherein the first device queue is created by the first control element before transmittal of the fourth message and without user input selecting the browse result.

8. The method of claim 1 wherein the first device queue references a second multimedia file which is available from a second media server connected to the network.

9. The method of claim 1 further comprising the step of:
creating the first device queue to reference a second multimedia file and a third multimedia file which are associated with metadata wherein the first control element selects the second multimedia file and the third multimedia file for inclusion in the first plurality of multimedia files listed by the first device queue based on queue creation instructions sent from the first mobile device to the first control element and further wherein the first mobile device does not have access to the metadata associated with the second multimedia file and the third multimedia file when the second multimedia file and the third multimedia file are selected by the first control element.

10. The method of claim 1 further comprising the step of:
controlling rendering of the first plurality of multimedia files on the first media rendering device during the playback initiated by the fourth message wherein the rendering of the first plurality of multimedia files during the playback initiated by the fourth message is controlled using rendering instructions transmitted from a second mobile device to the first control element wherein the second mobile device is connected to the first control element and is a different mobile device than the first mobile device.

11. The method of claim 1 further comprising the steps of:
transmitting a fifth message from the first mobile device to the first control element wherein the fifth message identifies a second plurality of multimedia files listed by a second device queue wherein the first control element responds to receipt of the fifth message by creating a second device queue and storing information about the second device queue wherein the information identifies the second plurality of multimedia files, an association of the second plurality of multimedia files with a second rendering device, and a playback position in the second plurality of multimedia files; and
directing the second media rendering device connected to the network to initiate playback of the second plurality of multimedia files listed by the second device queue wherein the first device queue and the second device queue reference at least one different multimedia file relative to each other and further wherein the second media rendering device provides the playback of the second plurality of multimedia files during the first media rendering device providing the playback of the first plurality of multimedia files.

12. The method of claim 1 further comprising the step of:
sending a rendering device transfer message from the first mobile device to the first control element wherein a second media rendering device connected to the network initiates playback of the first plurality of multimedia files listed by the first device queue and the first media rendering device stops the playback of the first plurality of multimedia files listed by the first device queue based on the rendering device transfer message wherein the second media rendering device initiates the playback at the playback position at which the playback was stopped on the first media rendering device.

13. The method of claim 1 wherein the first control element and a second control element connected to the network determine that one of the first control element and the second control element is a master control element that has superiority over the other control element.

14. The method of claim 13 wherein determination of the master control element is based on capabilities of the first control element and capabilities of the second control element.

15. The method of claim 13 wherein the first control element transfers the information to the second control element in response to determination that the second control element is the master control element.

16. The method of claim 1 further comprising the step of:
transmitting queue creation instructions in the third message transmitted from the first mobile device to the first control element wherein the queue creation instructions specify the first order.

17. The method of claim 1 further comprising the step of:
transmitting queue management instructions from the first mobile device to the first control element after the first media rendering device initiates the playback of the plurality of multimedia files listed by the first device queue wherein the queue management instructions specify a second order which is different than the first order and further wherein the first control element responds to the queue management instructions by modifying the information stored by the first control element about the first device queue wherein the information identifies the first order before modification of the information and identifies the second order after the modification of the information.

18. The method of claim 1 wherein the first mobile device is connected to the first control element by a carrier mobile network and further wherein the carrier mobile network is provided by a mobile phone service provider.

19. The method of claim 1 further comprising the steps of:
disconnecting the first mobile device from the first control element; and
continuing the playback of the first plurality of multimedia files listed by the first device queue on the first media rendering device while the first mobile device is disconnected from the first control element wherein the playback is controlled by the first control element while the first mobile device is disconnected from the first control element.

20. The method of claim 1 further comprising the step of:
transmitting an event message from the first control element to the first mobile device wherein the first mobile device disconnects from the first control element and then re-connects to the first control element and further wherein the event message conveys information about an event that occurred while the first mobile device was disconnected from the first control element.

21. The method of claim 20 wherein the event message indicates that the first media rendering device completed playback of one of the first plurality of multimedia files listed by the first device queue.

22. The method of claim 20 wherein the event message indicates a change in a playback state of the first media rendering device:

23. The method of claim 1 further comprising the step of:
transmitting an event message from the first control element to the first mobile device wherein transmission of the event message responds to a request transmitted from the first mobile device to the first control element and further wherein the event message indicates one of availability of the first media server, unavailability of the first media server, and a presence of updated content on the first media server.

24. The method of claim 23 wherein the request is one of a plurality of requests transmitted by the first mobile device to the first control element wherein the first mobile device automatically transmits one of the plurality of requests to the first control element at a periodic time interval.

25. The method of claim 1 further comprising the step of:
transmitting queue management instructions from the first mobile device to the first control element when the first media rendering device is rendering one of the plurality of multimedia files listed by the first device queue wherein the first control element directs the first media rendering device to stop rendering the one of the plurality of multimedia files and initiate rendering of a different multimedia file of the plurality of multimedia files listed by the first device queue in response to the queue management instructions.

26. The method of claim 1 further comprising the step of:
transmitting queue management instructions from the first mobile device to the first control element after the first media rendering device initiates the playback of the plurality of multimedia files listed by the first device queue wherein the queue management instructions identify an additional multimedia file and further wherein the first control element responds to the queue management instructions by modifying the first device queue to reference a second plurality of multimedia files which includes the additional multimedia file.

27. The method of claim 1 further comprising the steps of:
transmitting subscription instructions from the first mobile device to the first control element;
collecting event messages transmitted from devices connected to the network wherein the first control element collects the event messages in response to the subscription instructions; and
transmitting the event messages from the first control element to the first mobile device.

28. A system for managing media rendering in a network using a first mobile device wherein a first media rendering device is connected to the network and further wherein the first media rendering device renders a first queue of multimedia files wherein a second media rendering device is connected to the network and further wherein the second media rendering device renders a second queue of multimedia files wherein the first mobile device, the first media rendering device and the second media rendering device are different devices, the system comprising:
a first control interface connected to the first mobile device;
a core component connected to the first control interface wherein the first mobile device transmits first queue rendering instructions to the core component via the first control interface wherein the first queue rendering instructions comprise one or more communications sent from the first mobile device to the core component via the first control interface;
a storage component connected to the core component wherein the storage component stores information about the first queue and the second queue; and
a control point component connected to the core component and the network wherein the core component, the storage component and the control point component are resident in a single device which is a different device than the first mobile device, the first media rendering device and the second media rendering device wherein the control point component transmits a first message to the first media rendering device and further wherein the first message is based on the first queue rendering instructions wherein the first media rendering device provides playback of the first queue of multimedia files based on the first message wherein the control point component transmits a second message to the second media rendering device and further wherein the second message is based on the first queue rendering instructions and further wherein the second media rendering device provides playback of the second queue of multimedia files based on the second message wherein the control point component automatically directs the first media rendering device to render the next multimedia file in the first queue in response to the control point component receiving a first event message which indicates completion of rendering of one of the multimedia files in the first queue and further wherein the control point component automatically directs the second media rendering device to render the next multimedia file in the second queue in response to the control point component receiving a second event message which indicates completion of rendering of one of the multimedia files in the second queue.

29. The system of claim 28 wherein the first mobile device transmits queue editing instructions to the core component via the first control interface wherein the queue editing instructions enable a user of the first mobile device to add a selected multimedia file to one of the first queue and the second queue, remove a specified multimedia file from one of the first queue and the second queue and change a position of a selected multimedia file within one of the first queue and the second queue.

30. The system of claim 28 further comprising:
a second control interface connected to the core component; and
a second mobile device connected to the second control interface wherein the second mobile device transmits second queue rendering instructions to the core component via the second control interface and further wherein the control point component transmits a third message to the first media rendering device wherein the third message is based on the second queue rendering instructions and further wherein the first media rendering device renders the first queue of multimedia files based on the third message.

31. The system of claim 28 wherein the information stored by the storage element identifies the multimedia files in the first queue, the multimedia files in the second queue, an association of the first queue with the first media rendering device, an association of the second queue with the second media rendering device, a playback position of the first queue, and a playback position of the second queue.

32. A method for managing media rendering in a network wherein a control element, a first media rendering device and a first media server are connected to the network and further wherein a first mobile device and a second mobile device are connected to the control element wherein the first mobile device, the second mobile device and the first media rendering device are different devices wherein the control element is resident in a single device which is a different device than the first mobile device, the second mobile device and the first media rendering device wherein a first multimedia file and a second multimedia file are available from the first media server wherein the first multimedia file is associated with first metadata and the second multimedia file is associated with second metadata, the method comprising the steps of:
transmitting a first message wherein the first message is transmitted from the first mobile device to the control element;
creating a first device queue having the first metadata and the second metadata wherein the first device queue is created based on the first message transmitted to the control element; and
rendering the first device queue on the first media rendering device wherein the first mobile device and the second mobile device control rendering of the first device queue using rendering instructions transmitted from the first mobile device and the second mobile device to the control element.

33. The method of claim 32 further comprising the step of:
transmitting a lock request from the second mobile device wherein the lock request identifies the first device queue and prevents the first mobile device from accessing the first device queue and further wherein the first media rendering device renders the first device queue while the first mobile device is prevented from accessing the first device queue.

34. The method of claim 32 further comprising the step of:
creating a second device queue wherein the control element creates the second device queue based on device queue creation instructions transmitted from the second mobile device to the control element.

35. The method of claim 32 further comprising the step of:
changing the first device queue to a modified device queue wherein the first device queue and the modified device queue have at least one of a different multimedia file and a different order of multimedia files and further wherein the control element changes the first device queue to the modified device queue based on a second message wherein the second message is transmitted from the second mobile device to the control element.

* * * * *